United States Patent
Morozumi et al.

(10) Patent No.: US 7,636,187 B2
(45) Date of Patent: Dec. 22, 2009

(54) OPTICAL SHUTTER FOR DISPLAY DEVICE, IMAGE DISPLAY APPARATUS, AND APPARATUS AND METHOD FOR MANUFACTURING THE OPTICAL SHUTTER

(75) Inventors: Takeshi Morozumi, Miyagi (JP); Kenichi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 11/956,973

(22) Filed: Dec. 14, 2007

(65) Prior Publication Data
US 2008/0174846 A1 Jul. 24, 2008

(30) Foreign Application Priority Data
Dec. 14, 2006 (JP) .............................. 2006-336990
Nov. 22, 2007 (JP) .............................. 2007-302410

(51) Int. Cl.
 *G02B 26/02* (2006.01)
(52) U.S. Cl. ..................................................... 359/228
(58) Field of Classification Search ................. 359/228, 359/242, 253, 254
See application file for complete search history.

(56) References Cited

U.S. PATENT DOCUMENTS

| 6,583,840 B1 | 6/2003 | Inoue et al. |
| 6,967,763 B2 * | 11/2005 | Fujii et al. ................... 359/297 |
| 2001/0035925 A1 | 11/2001 | Kaneko et al. |
| 2005/0128370 A1 | 6/2005 | Moon |
| 2006/0077330 A1 | 4/2006 | Ijzerman et al. |
| 2006/0279848 A1 * | 12/2006 | Kuiper et al. ............... 359/666 |

FOREIGN PATENT DOCUMENTS

| JP | 2000-347171 | 12/2000 |
| JP | 2002-131717 | 5/2002 |
| JP | 2002-148625 | 5/2002 |
| JP | 2003-262847 | 9/2003 |
| JP | 2005-173605 | 6/2005 |
| JP | 2005284261 | 10/2005 |
| JP | 2006-519412 | 8/2006 |

* cited by examiner

*Primary Examiner*—Euncha P Cherry
(74) *Attorney, Agent, or Firm*—K & L Gates LLP

(57) ABSTRACT

An optical shutter for a display device includes a partition wall surrounding and isolating a light-transmitting portion; a polar liquid having polarity, allowing light transmission, and placed at the light-transmitting portion; a nonpolar liquid having no polarity, blocking light, and placed at the light-transmitting portion; an insulator having hydrophobic properties and disposed over the entire light-transmitting portion; and first and second electrodes that are different. When no voltage is applied across the first and second electrodes, the nonpolar liquid spreads near the insulator, becomes stable, and thus blocks the light. When a voltage is applied across the first and second electrodes, the polar liquid gravitates toward the insulator because of a change in wettability of the insulator against the polar liquid and causes the nonpolar liquid to collect in part of the light-transmitting portion according to the level of the voltage, thereby controlling the amount of transmission of light.

14 Claims, 23 Drawing Sheets

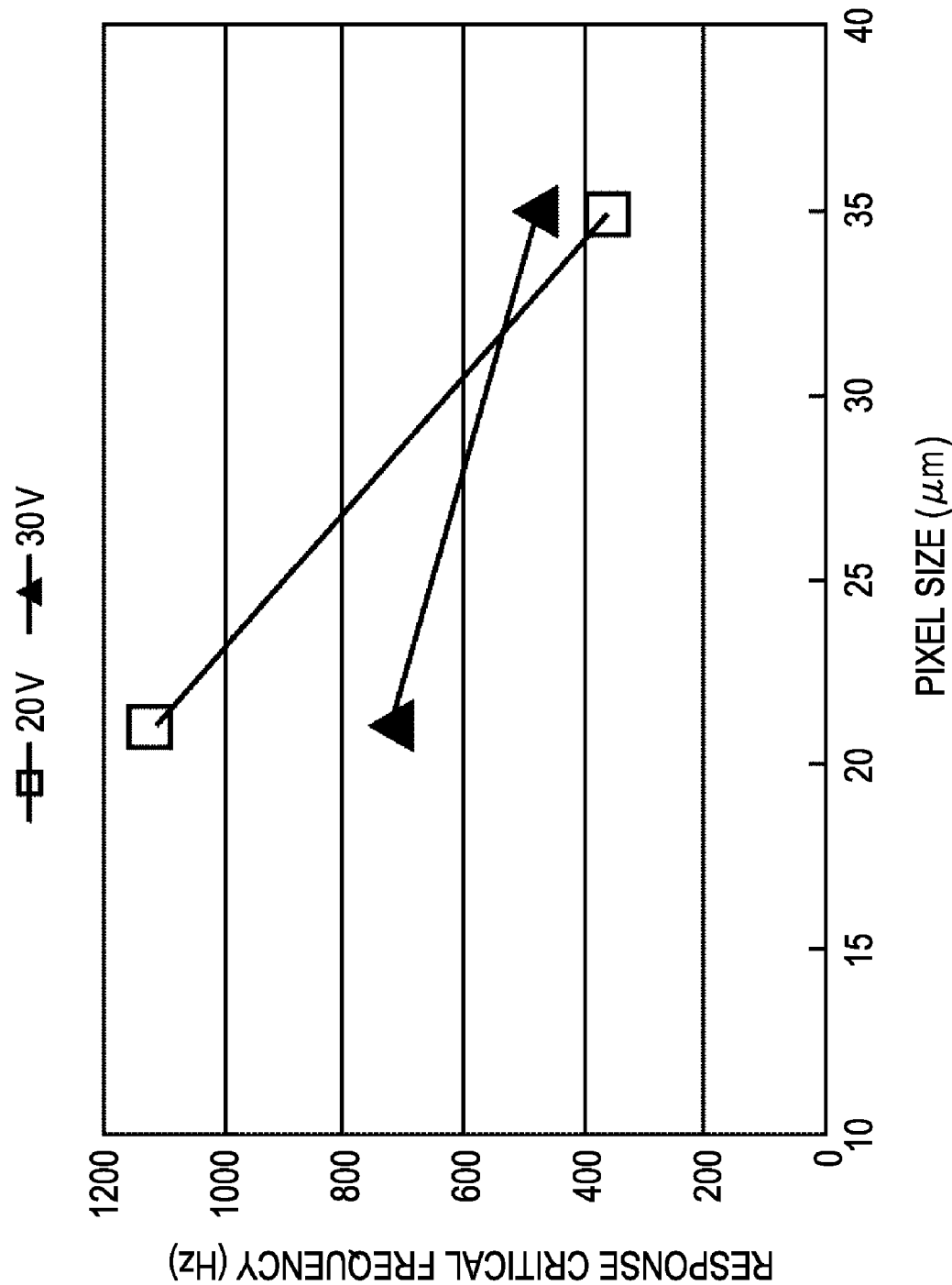

FIG. 10

| RIB HEIGHT [μm] | PIXEL SIZE [μm] (LINE WIDTH) | | | |
|---|---|---|---|---|
| | 115 × 115 (5 μm) | 75 × 75 (5 μm) | 35 × 35 (5 μm) | 21 × 21 (3 μm) |
| 2 | NO OPTIMUM PROCESSING TIME / IMPOSSIBLE | NO OPTIMUM PROCESSING TIME / IMPOSSIBLE | RECOMMENDATION: 1 min. | RECOMMENDATION: 1 min. |
| 3 | NO OPTIMUM PROCESSING TIME / IMPOSSIBLE | RECOMMENDATION: 2 to 3 min. | RECOMMENDATION: 2 to 3 min. | RECOMMENDATION: 2 to 3 min. |
| 8 | RECOMMENDATION: 5 to 6 min. | RECOMMENDATION: 7 to 8 min. | RECOMMENDATION: 7 to 8 min. | RECOMMENDATION: 10 min. |

OPTICAL SHUTTER FOR DISPLAY DEVICE, IMAGE DISPLAY APPARATUS, AND APPARATUS AND METHOD FOR MANUFACTURING THE OPTICAL SHUTTER

CROSS REFERENCES TO RELATED APPLICATIONS

The present application claims priority to Japanese Patent Applications JP 2006-336990 filed in the Japanese Patent Office on Dec. 14, 2006, and JP 2007-302410 filed in the Japanese Patent Office on Nov. 11, 2007, the entire contents of which are incorporated herein by reference.

BACKGROUND

The present application relates to an optical shutter for a display device, an image display apparatus including the optical shutter, and an apparatus and method for manufacturing the optical shutter. In particular, the present application relates to an optical shutter for a display device, the optical shutter being capable of operating at high speed and providing improved light extraction efficiency, to an image display apparatus including the optical shutter, and to an apparatus and method for manufacturing the optical shutter.

There have been studied various techniques that relate to optical shutters for a display device. For example, for improvement of optical shutters with liquid crystal, angles of liquid crystal particles with respect to an absorption axis of a polarizer are modified (e.g., see Japanese Unexamined Patent Application Publication No. 2005-284261), techniques for application of an electric field (e.g., see Japanese Unexamined Patent Application Publications Nos. 2003-262847 and 2002-131717) and alignment processing (e.g., see Japanese Unexamined Patent Application Publication No. 2002-148625) are developed, and asperities are formed on a substrate surface (e.g., see Japanese Unexamined Patent Application Publication No. 2000-347171). However, because of the principle of a liquid crystal display device, a polarizer is used in each case. Therefore, the amount of light actually extracted is as small as several percent of the amount of light of a light source (i.e., light extraction efficiency is low). Additionally, the response speed of liquid crystal display devices currently available are as low as about five milliseconds.

On the other hand, there is a method in which electrowetting technology is used for display on a display device. For example, a liquid device containing liquid is used as an optical shutter for light to be output from a light source (light emitter). The liquid device includes at least one type of polar liquid, at least one type of nonpolar liquid, an insulating film, and electrodes. In the liquid device, application of an electric field changes wettability (surface tension) between the insulating film and the polar liquid. This technique (electrowetting) makes it possible to change the contact angle of the nonpolar liquid with respect to the insulating film. In other words, it is possible to change the curvature radius of the surface of the nonpolar liquid without changing the volume of the nonpolar liquid. At the same time, if a black dye which does not allow light to pass through is dissolved in either one of the polar liquid and the nonpolar liquid, light can be alternately transmitted or blocked by varying the voltage.

Unlike a conventional optical shutter, such a liquid device does not require a polarizing filter or the like. Therefore, the efficiency of light extraction in the liquid device is much higher than that in the conventional optical shutter.

However, optical shutters for a display device are typically expected to provide higher brightness and operate at higher speed. For an optical shutter to which the above-described electrowetting is applied, the amount of oil filled in pixels is not disclosed in detail. The response speed of such an optical shutter is as low as 0.1 millisecond, which needs to be higher. Additionally, the drive voltage corresponding to this response speed is as extremely high as 30 V or above, which needs to be lower.

The present application has been made in view of the circumstances described above. It is desirable to achieve high-speed and low-voltage operation and improve light extraction efficiency.

SUMMARY

According to an embodiment, there is provided an optical shutter for controlling the amount of transmission of light emitted from a display device. The optical shutter includes a partition wall configured to surround and isolate a light-transmitting portion through which the light is transmitted; a polar liquid having polarity, allowing transmission of light, and placed at the light-transmitting portion surrounded by the partition wall; a nonpolar liquid having no polarity, blocking transmission of light, and placed at the light-transmitting portion surrounded by the partition wall; an insulator having hydrophobic properties and disposed over the entire light-transmitting portion surrounded by the partition wall; a first electrode; and a second electrode different from the first electrode. When no voltage is applied across the first electrode and the second electrode, the nonpolar liquid spreads near the insulator, becomes stable, and thus blocks transmission of the light. When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light. The optical shutter satisfies the following conditions:

$$100\ \mu m^2 \leq A \leq 30000\ \mu m^2$$

$$1\ \mu m \leq H \leq 10\ \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, the optical shutter further includes two substrates facing each other. In the optical shutter, the first electrode and the second electrode are formed on respective facing surfaces of the two substrates, the partition wall and the insulator are formed on a side adjacent to one of the facing surfaces of the two substrates, and the polar liquid and the nonpolar liquid are placed in a portion interposed between the two substrates and surrounded by the partition wall.

According to another embodiment, the optical shutter further includes a color filter disposed downstream of the polar liquid and the nonpolar liquid in a direction in which the light is output.

According to another embodiment, in the optical shutter, the nonpolar liquid is colored to block the light.

According to another embodiment, the optical shutter further includes a white scattering plate disposed on a side opposite to the display device.

According to another embodiment, out of the first electrode and the second electrode in the optical shutter, an electrode on a side opposite to the display device is opaque.

According to another embodiment, there is provided an image display apparatus including a light source and an image display unit configured to transmit light emitted from the light source. The image display unit has an optical shutter for controlling the amount of transmission of the light emitted from the light source. The optical shutter includes a partition wall configured to surround and isolate a light-transmitting portion through which the light is transmitted; a polar liquid having polarity, allowing transmission of light, and placed at the light-transmitting portion surrounded by the partition wall; a nonpolar liquid having no polarity, blocking transmission of light, and placed at the light-transmitting portion surrounded by the partition wall; an insulator having hydrophobic properties and disposed over the entire light-transmitting portion surrounded by the partition wall; a first electrode; and a second electrode different from the first electrode. When no voltage is applied across the first electrode and the second electrode, the nonpolar liquid spreads near the insulator, becomes stable, and thus blocks transmission of the light. When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light. The image display apparatus satisfies the following conditions:

$$100 \, \mu m^2 \leq A \leq 30000 \, \mu m^2$$

$$1 \, \mu m \leq H \leq 10 \, \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, the image display apparatus further includes two substrates facing each other. In the image display apparatus, the first electrode and the second electrode are formed on respective facing surfaces of the two substrates, the partition wall and the insulator are formed on a side adjacent to one of the opposite surfaces of the two substrates, and the polar liquid and the nonpolar liquid are placed in a portion interposed between the two substrates and surrounded by the partition wall.

According to another embodiment, the image display apparatus further includes a color filter disposed downstream of the polar liquid and the nonpolar liquid in a direction in which the light is output.

According to another embodiment, in the image display apparatus, the nonpolar liquid is colored to block the light.

According to another embodiment, the image display apparatus further includes a white scattering plate disposed on a side opposite to the display device.

According to another embodiment, out of the first electrode and the second electrode in the image display apparatus, an electrode on a side opposite to the display device is opaque.

According to another embodiment, there is provided an optical shutter manufacturing apparatus for manufacturing an optical shutter for controlling the amount of transmission of light emitted from a display device. The optical shutter manufacturing apparatus includes a partition wall forming unit configured to form, on a transparent substrate, a partition wall for surrounding and isolating a light-transmitting portion through which the light is transmitted. The partition wall forming unit forms the partition wall such that the optical shutter satisfies the following conditions:

$$100 \, \mu m^2 \leq A \leq 30000 \, \mu m^2$$

$$1 \, \mu m \leq H \leq 10 \, \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, in the optical shutter manufacturing apparatus, the partition wall forming unit forms the partition wall such that the height of the partition wall is made as low as possible within an allowable range.

According to another embodiment, the optical shutter manufacturing apparatus further includes a surface treating unit configured to apply ultraviolet/ozone treatment to a surface of the partition wall formed by the partition wall forming unit. By controlling processing time of the ultraviolet/ozone treatment, the surface treating unit controls the amount of a nonpolar liquid having no polarity, blocking light, and applied to a portion surrounded by the partition wall.

According to another embodiment, the optical shutter manufacturing apparatus further includes a black matrix forming unit configured to form, on the substrate, a black matrix of black resist containing a black pigment or dye. In the optical shutter manufacturing apparatus, the partition wall forming unit forms the partition wall on the black matrix formed by the black matrix forming unit.

According to another embodiment, there is provided an optical shutter manufacturing method carried out by an optical shutter manufacturing apparatus for manufacturing an optical shutter for controlling the amount of transmission of light emitted from a display device. The optical shutter manufacturing method includes the step of forming, on a transparent substrate, a partition wall for surrounding and isolating a light-transmitting portion through which the light is transmitted. The partition wall is formed such that the following conditions are satisfied:

$$100 \, \mu m^2 \leq A \leq 30000 \, \mu m^2$$

$$1 \, \mu m \leq H \leq 10 \, \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, there is provided an optical shutter for controlling the amount of transmission of light emitted from a display device. The optical shutter includes a partition wall configured to surround and isolate a light-transmitting portion through which the light is transmitted; a polar liquid having polarity, allowing transmission of light, and placed at the light-transmitting portion surrounded by the partition wall; a nonpolar liquid having no polarity, blocking transmission of light, and placed at the light-transmitting portion surrounded by the partition wall; an insulator having hydrophobic properties and disposed over the entire light-transmitting portion surrounded by the partition wall; a first electrode; and a second electrode different from the first electrode. When no voltage is applied across the first electrode and the second electrode, the nonpolar liquid spreads near the insulator, becomes stable, and thus blocks transmission of the light. When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light.

According to another embodiment, there is provided an image display apparatus including a light source and an image display unit configured to transmit light emitted from the light source. The image display unit has an optical shutter for controlling the amount of transmission of the light emitted from the light source. The optical shutter includes a partition wall configured to surround and isolate a light-transmitting portion through which the light is transmitted; a polar liquid having polarity, allowing transmission of light, and placed at the light-transmitting portion surrounded by the partition wall; a nonpolar liquid having no polarity, colored in at least one of red, green and blue, and placed at the light-transmitting portion surrounded by the partition wall; an insulator having hydrophobic properties and disposed over the entire light-transmitting portion surrounded by the partition wall; a first electrode; and a second electrode different from the first electrode. When no voltage is applied across the first electrode and the second electrode, the nonpolar liquid spreads near the insulator, becomes stable, and thus blocks transmission of the light. When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light.

According to an embodiment, it makes it possible to control, as necessary, the amount of transmission of light output from a light source. In particular, according to an embodiment, it makes it possible to provide an optical shutter that can operate at high speed and achieve a high efficiency of light extraction.

Additional features and advantages are described herein, and will be apparent from, the following Detailed Description and the figures.

BRIEF DESCRIPTION OF THE FIGURES

FIG. 9 is a graph showing a relationship between a pixel size and a response critical frequency.

FIG. 10 is a table showing exemplary processing time for ultraviolet/ozone treatment based on the relationship between pixel size and rib height.

DETAILED DESCRIPTION

Figure 1:
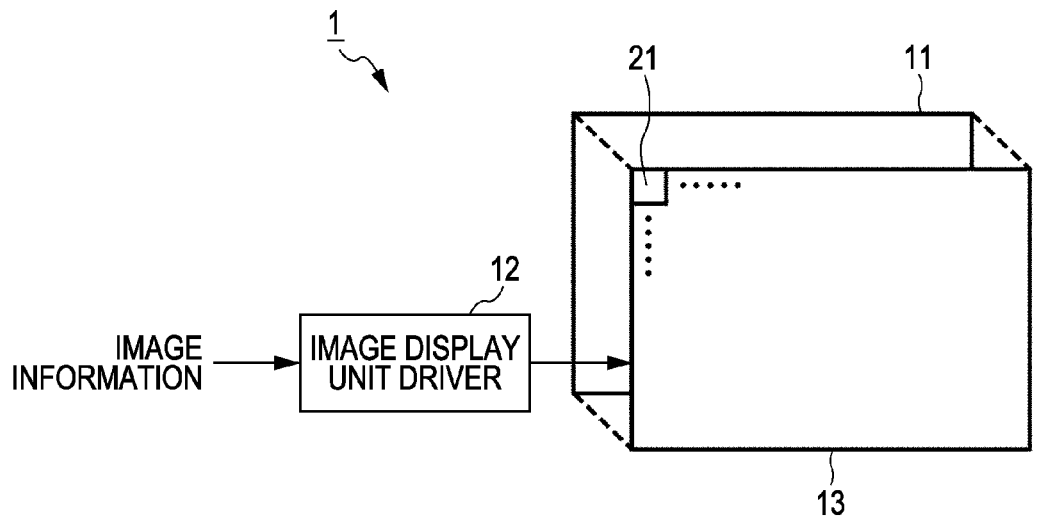
FIG. 1 is a block diagram illustrating an exemplary configuration of an image display apparatus in an embodiment.

According to an embodiment, there is provided an optical shutter (e.g., liquid device 21 of FIG. 1) for controlling the amount of transmission of light emitted from a display device. The optical shutter includes a partition wall (e.g., rib 34-1 and rib 34-2 of FIG. 2) configured to surround and isolate a light-transmitting portion through which the light is transmitted; a polar liquid (e.g., polar liquid 36 of FIG. 2) having polarity, allowing transmission of light, and placed at the light-transmitting portion surrounded by the partition wall; a nonpolar liquid (e.g., nonpolar liquid 35 of FIG. 2) having no polarity, blocking transmission of light, and placed at the light-transmitting portion surrounded by the partition wall; an insulator (e.g., insulator 33 of FIG. 2) having hydrophobic properties and disposed over the entire light-transmitting portion surrounded by the partition wall; a first electrode (e.g., lower electrode 32 of FIG. 2); and a second electrode (e.g., upper electrode 37 of FIG. 2) different from the first electrode. When no voltage is applied across the first electrode and the second electrode, the nonpolar liquid spreads near the insulator, becomes stable, and thus blocks transmission of the light (see, e.g., FIG. 4). When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light (see, e.g., FIG. 5). The optical shutter satisfies the following conditions:

$$100\ \mu m^2 \leq A \leq 30000\ \mu m^2$$

$$1\ \mu m \leq H \leq 10\ \mu m,$$

and preferably satisfies the following conditions:

$$400\ \mu m^2 \leq A \leq 1600\ \mu m^2$$

$$2\ \mu m \leq H \leq 4\ \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, the optical shutter further includes two substrates (e.g., lower substrate 31 and upper substrate 38 of FIG. 2) facing each other. In the optical shutter, the first electrode and the second electrode are formed on respective facing surfaces of the two substrates, the partition wall and the insulator are formed on a side adjacent to one of the facing surfaces of the two substrates, and the polar liquid and the nonpolar liquid are placed in a portion interposed between the two substrates and surrounded by the partition wall.

According to another embodiment, the optical shutter further includes a color filter (e.g., color filter 301 of FIG. 23) disposed downstream of the polar liquid and the nonpolar liquid in a direction in which the light is output.

Figure 2:
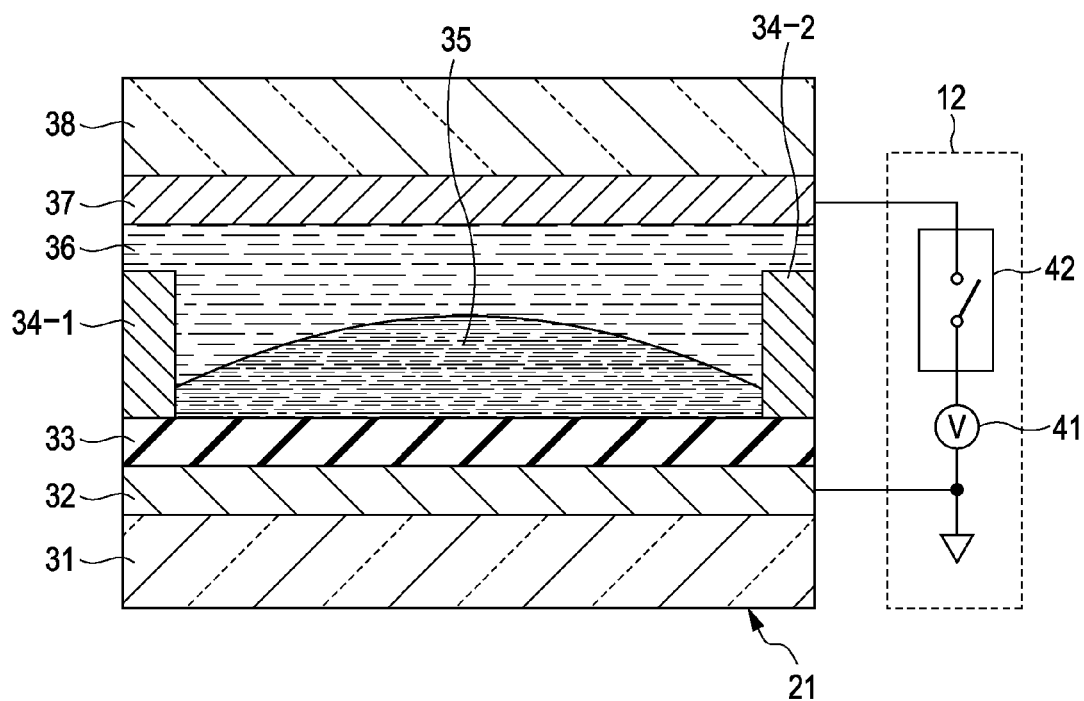
FIG. 2 illustrates an exemplary configuration of a liquid device illustrated in FIG. 1.

According to another embodiment, in the optical shutter, the nonpolar liquid is colored to block the light (see, e.g., nonpolar liquid 35 of FIG. 2).

According to another embodiment, the optical shutter further includes a white scattering plate (e.g., white scattering plate 421 of FIG. 26) disposed on a side opposite to the display device.

According to another embodiment, out of the first electrode and the second electrode in the optical shutter, an electrode (e.g., lower electrode 432 of FIG. 27) on a side opposite to the display device is opaque.

According to another embodiment, there is provided an image display apparatus (e.g., image display apparatus 1 of FIG. 1) including a light source (e.g., light-emitting source 11 of FIG. 1) and an image display unit (e.g., image display unit 13 of FIG. 1) configured to transmit light emitted from the light source. The image display unit has an optical shutter (e.g., liquid device 21 of FIG. 1) for controlling the amount of transmission of the light emitted from the light source. The optical shutter includes a partition wall (e.g., rib 34-1 and rib 34-2 of FIG. 2) configured to surround and isolate a light-transmitting portion through which the light is transmitted; a polar liquid (e.g., polar liquid 36 of FIG. 2) having polarity, allowing transmission of light, and placed at the light-transmitting portion surrounded by the partition wall; a nonpolar liquid (e.g., nonpolar liquid 35 of FIG. 2) having no polarity, blocking transmission of light, and placed at the light-transmitting portion surrounded by the partition wall; an insulator (e.g., insulator 33 of FIG. 2) having hydrophobic properties and disposed over the entire light-transmitting portion surrounded by the partition wall; a first electrode (e.g., lower electrode 32 of FIG. 2); and a second electrode (e.g., upper electrode 37 of FIG. 2) different from the first electrode. When no voltage is applied across the first electrode and the second electrode, the nonpolar liquid spreads near the insulator, becomes stable, and thus blocks transmission of the light (see, e.g., FIG. 4). When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light (see, e.g., FIG. 5). The image display apparatus satisfies the following conditions:

$$100\ \mu m^2 \leq A \leq 30000\ \mu m^2$$

$$1\ \mu m \leq H \leq 10\ \mu m,$$

and preferably satisfies the following conditions:

$$400\ \mu m^2 \leq A \leq 1600\ \mu m^2$$

$$2\ \mu m \leq H \leq 4\ \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, the image display apparatus further includes two substrates (e.g., lower substrate 31 and upper substrate 38 of FIG. 2) facing each other. In the image display apparatus, the first electrode and the second electrode are formed on respective facing surfaces of the two substrates, the partition wall and the insulator are formed on a side adjacent to one of the facing surfaces of the two substrates, and the polar liquid and the nonpolar liquid are placed in a portion interposed between the two substrates and surrounded by the partition wall.

According to another embodiment, the image display apparatus further includes a color filter (e.g., color filter 301 of FIG. 23) disposed downstream of the polar liquid and the nonpolar liquid in a direction in which the light is output.

According to another embodiment, in the image display apparatus, the nonpolar liquid is colored to block the light (see, e.g., nonpolar liquid 35 of FIG. 2).

According to another embodiment, the image display apparatus further includes a white scattering plate (e.g., white scattering plate 421 of FIG. 26) disposed on a side opposite to the display device.

According to another embodiment, out of the first electrode and the second electrode in the image display apparatus, an electrode (e.g., lower electrode 432 of FIG. 27) on a side opposite to the display device is opaque.

According to another embodiment, there is provided an optical shutter manufacturing apparatus (e.g., manufacturing apparatus 101 of FIG. 1) for manufacturing an optical shutter (e.g., liquid device 21 of FIG. 1) for controlling the amount of transmission of light emitted from a display device. The optical shutter manufacturing apparatus includes a partition wall forming unit (e.g., partition wall forming unit 134 of FIG. 11) configured to form, on a transparent substrate, a partition wall for surrounding and isolating a light-transmitting portion through which the light is transmitted. The partition wall forming unit forms the partition wall such that the optical shutter satisfies the following conditions:

$$100\ \mu m^2 \leq A \leq 30000\ \mu m^2$$

$$1\ \mu m \leq H \leq 10\ \mu m,$$

and preferably satisfies the following conditions:

$$400\ \mu m^2 \leq A \leq 1600\ \mu m^2$$

$$2\ \mu m \leq H \leq 4\ \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, in the optical shutter manufacturing apparatus, the partition wall forming unit forms the partition wall such that the height of the partition wall is made as low as possible within an allowable range (see, e.g., FIG. 9).

According to another embodiment, the optical shutter manufacturing apparatus further includes a surface treating unit (e.g., surface treating unit 135 of FIG. 11) configured to apply ultraviolet/ozone treatment to a surface of the partition wall formed by the partition wall forming unit. By controlling processing time of the ultraviolet/ozone treatment, the surface treating unit controls the amount of a nonpolar liquid having no polarity, blocking light, and applied to a portion surrounded by the partition wall.

According to another embodiment, the optical shutter manufacturing apparatus further includes a black matrix forming unit (e.g., black matrix forming unit 133 of FIG. 11) configured to form, on the substrate, a black matrix of black resist containing a black pigment or dye. In the optical shutter manufacturing apparatus, the partition wall forming unit forms the partition wall on the black matrix formed by the black matrix forming unit.

According to another embodiment, there is provided an optical shutter manufacturing method carried out by an optical shutter manufacturing apparatus (e.g., manufacturing apparatus 101 of FIG. 11) for manufacturing an optical shutter (e.g., liquid device 21 of FIG. 1) for controlling the amount of transmission of light emitted from a display device. The optical shutter manufacturing method includes the step (e.g., step S4 of FIG. 12) of forming, on a transparent substrate, a partition wall for surrounding and isolating a light-transmitting portion through which the light is transmitted. The partition wall is formed such that the following conditions are satisfied:

$$100\ \mu m^2 \leq A \leq 30000\ \mu m^2$$

$$1\ \mu m \leq H \leq 10\ \mu m,$$

and preferably, the following conditions are satisfied:

$$400\ \mu m^2 \leq A \leq 1600\ \mu m^2$$

$$2\ \mu m \leq H \leq 4\ \mu m,$$

where A denotes the area of a light-transmitting surface of the light-transmitting portion surrounded by the partition wall, the light-transmitting surface being orthogonal to a traveling direction of the light, and H denotes the height of the partition wall.

According to another embodiment, there is provided an optical shutter (e.g., liquid device 21 of FIG. 1) for controlling the amount of transmission of light emitted from a display device. The optical shutter includes a partition wall (e.g., rib 34-1 and rib 34-2 of FIG. 2) configured to surround and isolate a light-transmitting portion through which the light is transmitted; a polar liquid (e.g., polar liquid 36 of FIG. 2) having polarity, allowing transmission of light, and placed at the light-transmitting portion surrounded by the partition wall; a nonpolar liquid (e.g., nonpolar liquid 35 of FIG. 2) having no polarity, blocking transmission of light, and placed at the light-transmitting portion surrounded by the partition wall; an insulator (e.g., insulator 33 of FIG. 2) having hydrophobic properties and disposed over the entire light-transmitting portion surrounded by the partition wall; a first electrode (e.g., lower electrode 32 of FIG. 2); and a second electrode (e.g., upper electrode 37 of FIG. 2) different from the first electrode. When no voltage is applied across the first electrode and the second electrode, the nonpolar liquid spreads near the insulator, becomes stable, and thus blocks transmission of the light (see, e.g., FIG. 4). When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light (see, e.g., FIG. 5).

According to another embodiment, there is provided an image display apparatus (e.g., image display apparatus 1 of FIG. 1) including a light source (e.g., light-emitting source 11 of FIG. 1) and an image display unit (e.g., image display unit 13 of FIG. 1) configured to transmit light emitted from the light source. The image display unit has an optical shutter (e.g., liquid device 21 of FIG. 1) for controlling the amount of transmission of the light emitted from the light source. The optical shutter includes a partition wall (e.g., rib 34-1 and rib 34-2 of FIG. 2) configured to surround and isolate a light-transmitting portion through which the light is transmitted; a polar liquid (e.g., polar liquid 36 of FIG. 2) having polarity, allowing transmission of light, and placed at the light-transmitting portion surrounded by the partition wall; a nonpolar liquid (e.g., nonpolar liquid 35 of FIG. 2) having no polarity, colored in at least one of red, green and blue, and placed at the light-transmitting portion surrounded by the partition wall; an insulator (e.g., insulator 33 of FIG. 2) having hydrophobic properties and disposed over the entire light-transmitting portion surrounded by the partition wall; a first electrode (e.g., lower electrode 32 of FIG. 2); and a second electrode (e.g., upper electrode 37 of FIG. 2) different from the first electrode. When no voltage is applied across the first electrode and the second electrode, the nonpolar liquid spreads near the insulator, becomes stable, and thus blocks transmission of the light (see, e.g., FIG. 4). When a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light (see, e.g., FIG. 5).

Embodiments will now be described.

FIG. 1 is a block diagram illustrating an exemplary configuration of an image display apparatus to which the present application is applied.

Referring to FIG. 1, an image display apparatus 1 is an apparatus for displaying an image and includes a light-emitting source 11, an image display unit driver 12, and an image display unit 13. The image display apparatus 1 is a transmissive display which allows light from the light-emitting source 11 to be transmitted through the image display unit 13 to the user.

The light-emitting source 11 is a so-called backlight which is a light source for displaying an image. A hot-cathode tube, a cold-cathode tube, or anything that serves as a light source for displaying an image can be used as the light-emitting source 11.

The image display unit driver 12 controls the operation of the image display unit 13 (i.e., each of a plurality of liquid devices 21 constituting the image display unit 13) on the basis of image information (e.g., video signals) externally supplied.

The image display unit 13 is a device that is capable of displaying an image and is formed by arranging the plurality of liquid devices 21 in a flat or curved plane. Under the control of the image display unit driver 12, the liquid devices 21 control transmission of light emitted from the light-emitting source 11.

As illustrated in FIG. 1, the light-emitting source 11 has a flat or curved light-emitting surface from which light is emitted. The liquid devices 21 in the image display unit 13 are arranged substantially opposite the light-emitting surface of the light-emitting source 11. Although described in detail below, the liquid devices 21 operate as an optical shutter that controls the amount of transmission of light emitted from the light-emitting surface of the light-emitting source 11, in other words, controls the intensity of light transmitted through the liquid devices 21 themselves (i.e., controls the transmitted light intensity). Under the control of the image display unit driver 12, each liquid device 21 controls the transmitted light intensity on the basis of image information. This allows an image corresponding to the image information to be displayed on a surface of the array of the liquid devices 21 (i.e., on the entire surface of the image display unit 13), the surface being remote from the light-emitting source 11. In other words, when light transmitted through the liquid devices 21 operating on the basis of image information reaches the user's eye that is opposite the light-emitting source 11 with respect to the image display unit 13, it appears to the user that an image corresponding to the image information is displayed on the surface of the image display unit 13 (i.e., on the surface being adjacent to the user).

That is, the surface of the image display unit 13 remote from the light-emitting source 11 (i.e., the surface that is formed by arranging the liquid devices 21 and is distant from the light-emitting source 11) serves as an image display surface. The liquid devices 21 are generally expected to have a response time shorter than a light-emitting period of the light-emitting source 11.

Light from the light-emitting surface of the light-emitting source 11 may not necessarily be direct light emitted from a light source, but may be indirect light reflected off a reflector or the like. At the same time, although it is generally desirable that light from the light-emitting surface be white light that is uniform throughout the entire light-emitting surface, the light may not necessarily be either uniform or white light.

It is generally desirable that the area and shape of the light-emitting surface of the light-emitting source 11 be the same as those of the image display surface of the image display unit 13, and that the light-emitting source 11 and the image display unit 13 be disposed parallel to each other with a predetermined distance therebetween such that the light-emitting surface and the image display surface completely overlap each other as viewed in a direction orthogonal to the surfaces. However, the area and shape of the light-emitting surface may not necessarily need to be the same as those of the image display surface, the light-emitting surface and the image display surface may not necessarily need to completely overlap each other, and the light-emitting source 11 and the image display unit 13 may not necessarily need to be disposed parallel to each other with a predetermined distance therebetween. For example, the light-emitting source 11 and the image display unit 13 may be formed as a single unit.

At the same time, the liquid devices 21 in the image display unit 13 may be arranged in any pattern. For example, the liquid devices 21 may be arranged in either a regular pattern (e.g., in a matrix or in a honeycomb structure) or in an irregular pattern.

Next, the liquid devices 21 in the image display unit 13 will be described. As described above, the liquid devices 21 are devices serving as an optical shutter that controls the intensity of light emitted from the light-emitting surface of the light-emitting source 11 and transmitted through the liquid devices 21 themselves. FIG. 2 is a cross-sectional view illustrating an exemplary configuration of one of the liquid devices 21.

As illustrated in FIG. 2, the liquid device 21 has a multi-layer structure and includes a lower substrate 31, a lower electrode 32, an insulator 33, a rib 34-1, a rib 34-2, a nonpolar liquid 35, a polar liquid 36, an upper electrode 37, and an upper substrate 38.

The lower substrate 31 and the upper substrate 38 are light-transmissive transparent members made of glass, silicon, or the like. The lower electrode 32 and the upper electrode 37 are for applying a voltage to the polar liquid 36 as described below, and are transparent electrodes made of indium tin oxide (ITO), zinc oxide (ZnO), or the like. It will be understood that other materials having properties similar to those of the materials described above may be used.

The image display unit driver 12 provides a power supply 41 and a switch 42 for the lower electrode 32 and upper electrode 37 of each liquid device 21. The switch 42 operates in two modes, that is, an ON mode which makes an electrical connection between both terminals and an OFF mode which breaks an electrical connection between both terminals. The supply voltage of the power supply 41 is variable within a predetermined range and may be set to any value within the range. The supply voltage may be within any range. For example, the minimum supply voltage may be set to 0 V, while the maximum supply voltage may be set to a value which allows the nonpolar liquid 35 to be sufficiently deformed (or moved) and does not cause a problem, such as dielectric breakdown.

In accordance with the operation of the switch 42 and the control of supply voltage of the power supply 41, the image display unit driver 12 can apply, across the lower electrode 32 and the upper electrode 37, any voltage within an allowable range. For example, in the example of FIG. 2, one electrode of the power supply 41 is connected through the switch 42 to the upper electrode 37, while the other electrode of the power supply 41 is connected to the lower electrode 32. When the switch 42 enters the ON mode, that is, when the electrical connection is made, a voltage set by the power supply 41 is applied to the lower electrode 32 and the upper electrode 37. When the switch 42 enters the OFF mode, that is, when the electrical connection is broken, the potential difference between the lower electrode 32 and the upper electrode 37 becomes zero. The power supply 41 may be of any type, and the switch 42 may be of any type that is capable of controlling the application of a voltage across the lower electrode 32 and the upper electrode 37, the application being performed by the power supply 41.

It is desirable that the insulator 33 be of a material with high hydrophobicity and permittivity. For example, the insulator 33 is made of a fluorinated polymer, such as polyvinylidene fluoride (PVdF) or polytetrafluoroethylene (PTFE). Other materials with properties similar to those described above may also be used. For higher permittivity, it is desirable to reduce the thickness (i.e., film thickness) of the insulator 33 in the up-and-down direction in FIG. 2. However, for higher insulating strength, it is desirable to increase the film thickness of the insulator 33. Therefore, it is desirable to determine an optimum value by making a trade-off between higher permittivity and higher insulating strength. For example, if the insulator 33 is composed of an amorphous fluorocarbon polymer CYTOP (registered trademark) of standard grade AP2 (solution filtration: 0.2 µm) with a film thickness of 240 nm, dielectric breakdown does not occur until a potential difference between the lower electrode 32 and the upper electrode 37 reaches 30 V when ITO electrodes are used as the lower electrode 32 and the upper electrode 37, several micrometers of dodecane is used as the nonpolar liquid 35, and 40 µm of water is used as the polar liquid 36.

The rib 34-1 and the rib 34-2 are partition walls that separate adjacent liquid devices 21, each liquid device 21 having a light-transmitting portion through which light is transmitted. The rib 34-1 and the rib 34-2 are formed around the nonpolar liquid 35 (and part of the polar liquid 36) applied to the light-transmitting portion. Although FIG. 2, which is a cross-sectional view, illustrates the rib 34-1 and the rib 34-2 as two separate parts, the actual rib 34-1 and the rib 34-2 are connected to each other and are formed as a single member. Hereinafter, when there is no need to individually describe the rib 34-1 and the rib 34-2, they are referred to as a rib 34. At the same time, a portion surrounded by the rib 34 is referred to as a rib pixel. It is not desirable that the rib 34 either dissolve in or react with the polar liquid 36 and the nonpolar liquid 35. The rib 34 is typically made of a polymer resin, such as epoxy resin or acrylic resin. Other materials with properties similar to these resins may also be used.

The nonpolar liquid 35 and the polar liquid 36 are formed in the rib pixel. Droplets of the nonpolar liquid 35 and the polar liquid 36 are not mixed together and form two separate layers. The nonpolar liquid 35 is, for example, a silicon oil or a hydrocarbon material, such as decane, dodecane, hexadecane, or undecane. The nonpolar liquid 35 is a liquid containing a black dye or a liquid that is colored in black by dissolving a dye therein. The dye used here is one that can be dissolved in the nonpolar liquid 35 but cannot be dissolved in the polar liquid 36. A pigment that cannot be dissolved even in the nonpolar liquid 35 may be mixed into the nonpolar liquid 35. The polar liquid 36 is typically water or an aqueous solution in which an electrolyte, such as potassium chloride or sodium chloride, is dissolved.

In the downward direction (i.e., in the direction in which light is transmitted) in FIG. 2, the upper electrode 37 and the lower electrode 32 are disposed in this order, with the two layers of the polar liquid 36 and the nonpolar liquid 35 interposed between the upper electrode 37 and the lower electrode 32. The application of a voltage across the upper electrode 37 and the lower electrode 32 causes an electric field to be generated between the two layers. That is, with the application of a voltage across the upper electrode 37 and the lower electrode 32, wettability (or surface tension) between the polar liquid 36 and the insulator 33 is changed according to the applied voltage. Thus, the movement (or deformation) of the polar liquid 36 causes movement (or deformation) of the nonpolar liquid 35. Then, according to the amount of movement (or deformation) of the nonpolar liquid 35, the light transmission of the liquid device 21 is changed. In other words, the liquid device 21 operates as an optical shutter that controls the light transmission.

The nonpolar liquid 35 may be any liquid that is not mixed with the polar liquid 36 and is moved (or deformed) according to changes in wettability between the insulator 33 and the polar liquid 36 resulting from the application of a voltage. The polar liquid 36 may be any transparent liquid that is not mixed with the nonpolar liquid 35 and, at the same time, as long as wettability between the insulator 33 and the polar liquid 36 is changed by the application of a voltage across the lower electrode 32 and the upper electrode 37. For high response speed, it is desirable that both the nonpolar liquid 35 and polar liquid 36 have low viscosity.

Figure 3:
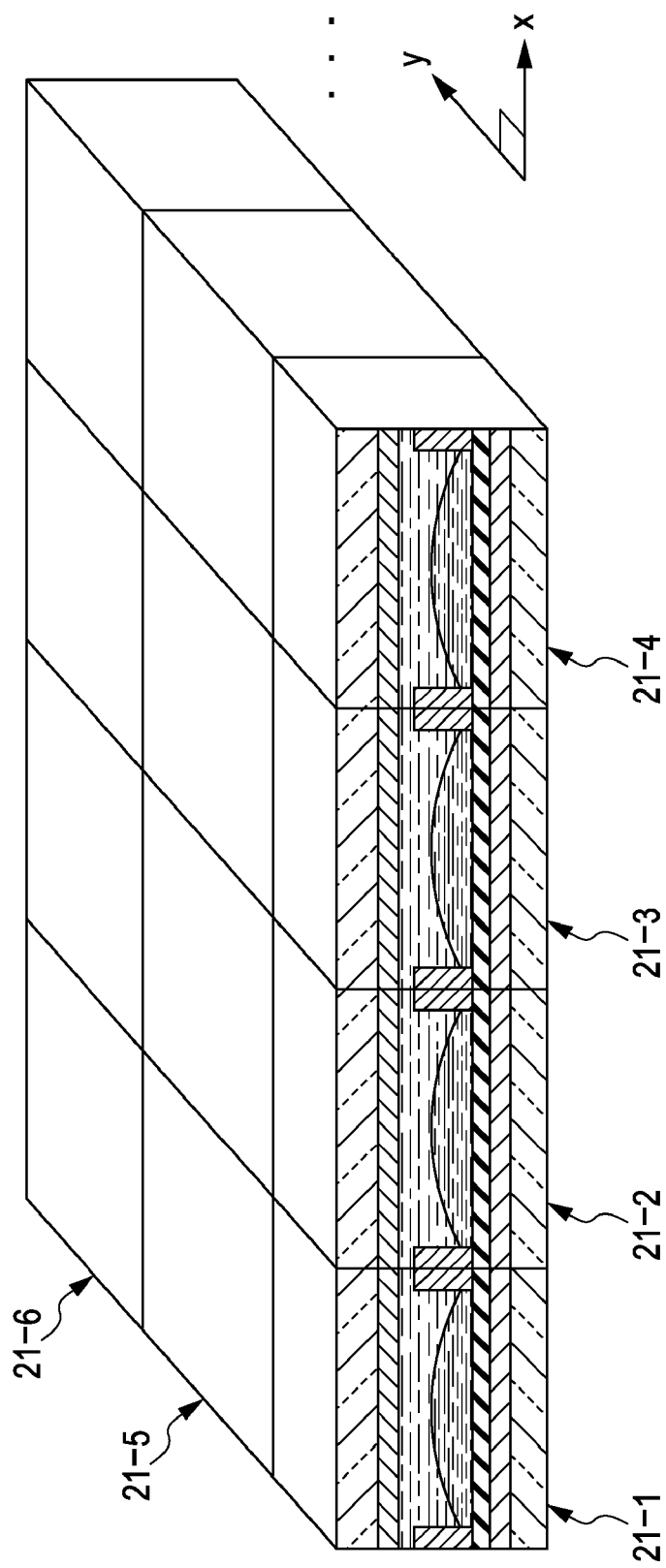
FIG. 3 illustrates an exemplary arrangement of liquid devices.

As illustrated in FIG. 3, the liquid devices 21 are typically arranged in an array. FIG. 3 illustrates an example of the liquid devices 21 arranged in the X-Y plane. In this example, the liquid devices 21 are arranged in a matrix without any gaps therebetween. Specifically, a liquid device 21-1, a liquid device 21-2, a liquid device 21-3, a liquid device 21-4, and the like are arranged in the X direction, while the liquid device 21-1, a liquid device 21-5, a liquid device 21-6, and the like are arranged in the Y direction.

In other words, in the case of FIG. 3, a space interposed between the lower substrate 31 and the upper substrate 38 is roughly divided by the rib 34 into a plurality of rib pixels in a matrix. Each of the plurality of rib pixels is filled with the nonpolar liquid 35 and the polar liquid 36 and operates as an individual liquid device 21.

For simplicity, FIG. 3 illustrates lower electrodes 32 and upper electrodes 37 of adjacent liquid devices 21 as being in contact with each other. In practice, however, the liquid devices 21 are arranged such that lower electrodes 32 and upper electrodes 37 of at least liquid devices 21 that operate independent of each other are not in contact with each other. Generally, the lower electrode 32 and upper electrode 37 of each liquid device 21 are arranged so as not to be in contact with those of adjacent liquid devices 21, and are configured such that a voltage can be independently applied to each liquid device 21. In other words, the image display unit driver 12 is capable of allowing the liquid devices 21 to operate independent of each other.

Figure 4:
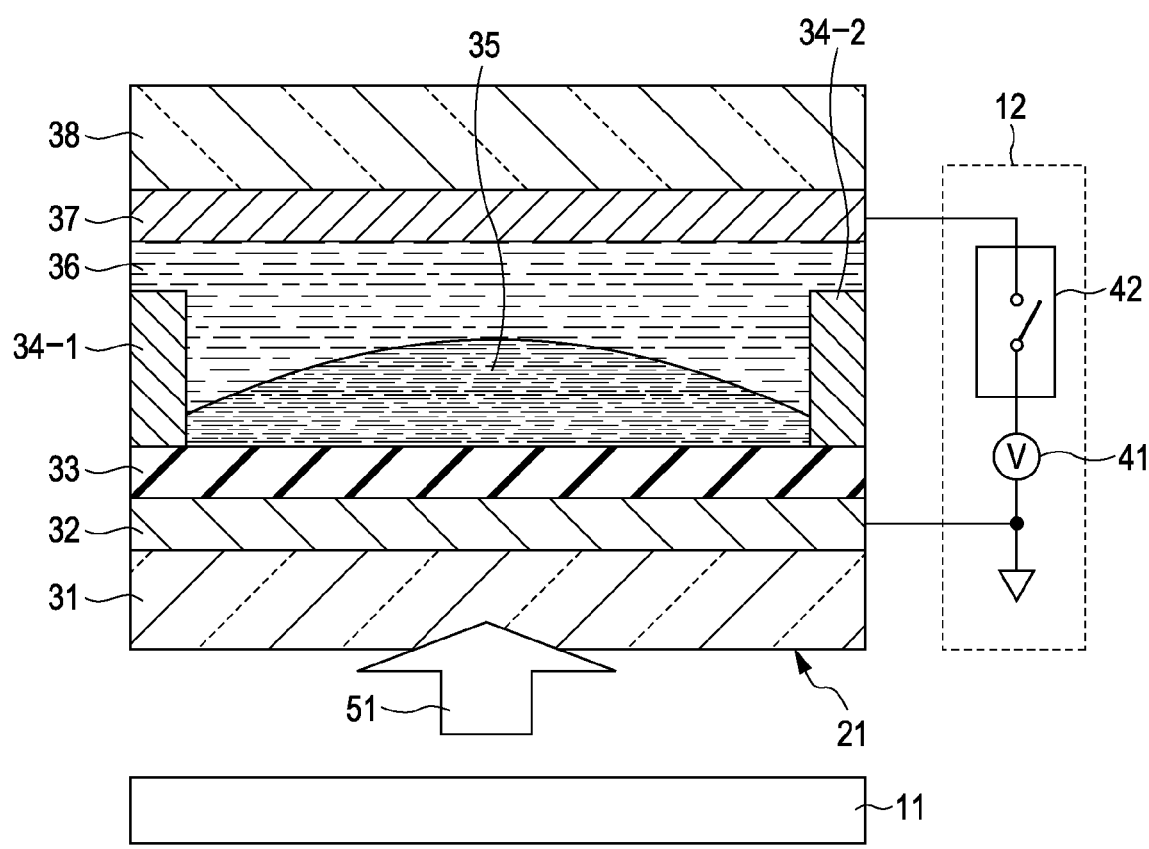
FIG. 4 illustrates an operation of a liquid device.

Next, the operation of the liquid devices 21 having the above configuration will be described. FIG. 4 illustrates a liquid device 21 in the state where the switch 42 is OFF or disconnected, and no voltage is applied across the lower electrode 32 and the upper electrode 37.

As illustrated in FIG. 4, when the switch 42 is OFF and the potential difference between the lower electrode 32 and the upper electrode 37 is zero or is regarded as being approximately zero, since the insulator 33 has hydrophobic properties, the nonpolar liquid 35 is kept closer to the insulator 33 than the polar liquid 36 is to the insulator 33 because of surface tension. In other words, when no voltage is applied across the lower electrode 32 and the upper electrode 37, the colored nonpolar liquid 35 spreads over the entire rib pixel, that is, the entire light-transmitting portion and becomes stable, as illustrated in FIG. 4.

Light (visual information) 51 from the light-emitting source 11 positioned at the rear of the liquid device 21 and illustrated on the lower side in FIG. 4 reaches the liquid device 21. However, since the nonpolar liquid 35 is made of a material containing a black dye, or is colored with a black dye or mixed with a black pigment, the light 51 cannot be transmitted through the liquid device 21. In other words, the light 51 emitted from the light-emitting source 11 is blocked by the nonpolar liquid 35.

Figure 5:
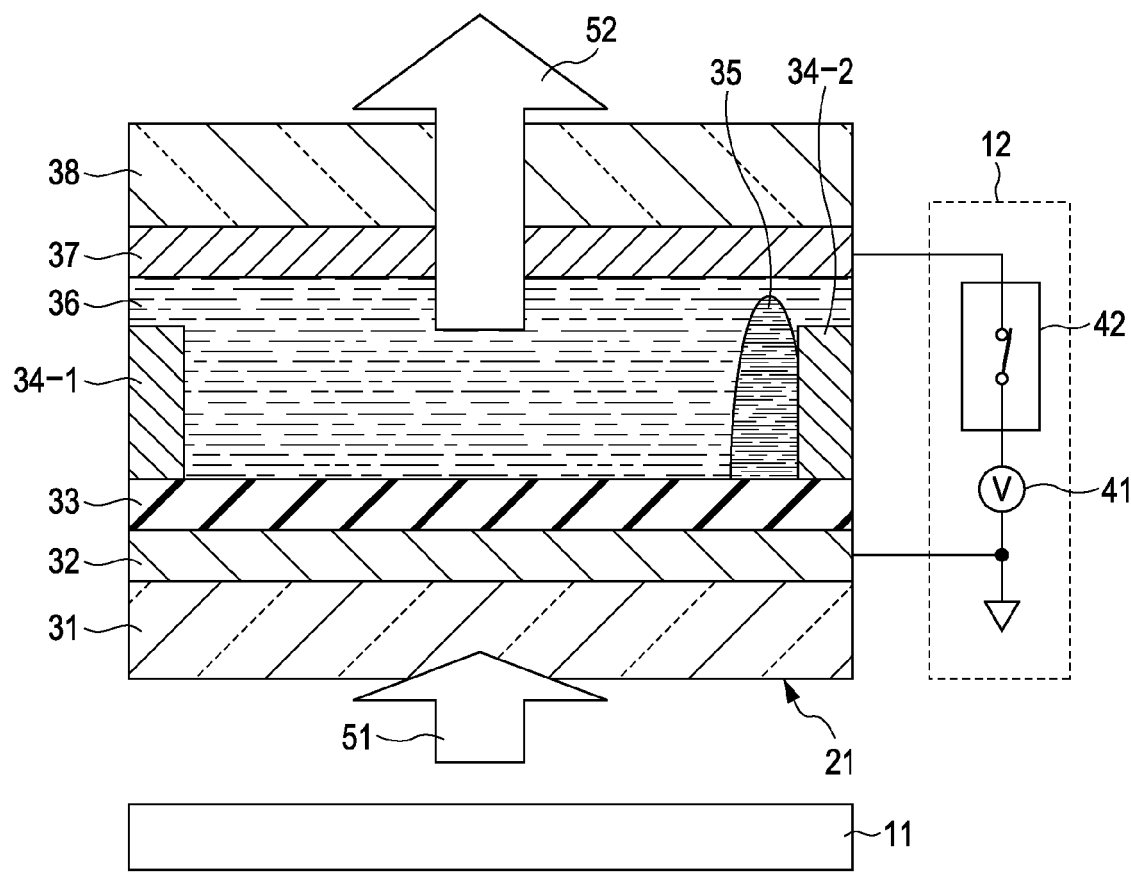
FIG. 5 illustrates another operation of the liquid device.

FIG. 5 illustrates the liquid device 21 in the state where the switch 42 is ON or connected, and a maximum voltage within a range that can be set in the power supply 41 is applied across the lower electrode 32 and the upper electrode 37 by the power supply 41.

When a supply voltage of the power supply 41 is applied across the lower electrode 32 and the upper electrode 37, polarization charge is generated in the direction of an electric field in the insulator 33 adjacent to the lower electrode 32. Then, electric charge is accumulated on a surface of the insulator 33 adjacent to the lower electrode 32 and a so-called electric-charge double-layer state occurs. Since the polar liquid 36 has a polarity, the Coulomb force of this electric charge causes the polar liquid 36 to be attracted to the insulator 33 adjacent to the lower electrode 32. In other words, the wettability of the insulator 33 against the polar liquid 36 is changed according to the voltage applied across the lower electrode 32 and the upper electrode 37. On the other hand, since the nonpolar liquid 35 has no polarity, such force is not generated. Therefore, the nonpolar liquid 35, which is black in color, is pushed by the movement of the polar liquid 36 toward the insulator 33, collects in a part of the portion surrounded by the rib 34 of the liquid device 21, and becomes stable as illustrated in FIG. 5. Since a maximum voltage is applied in the example of FIG. 5, the black nonpolar liquid 35 is pushed and deformed to a maximum extent by the polar liquid 36 deformed toward the insulator 33, collects to a maximum extent in a part of the portion surrounded by the rib 34, and becomes stable as illustrated in FIG. 5.

In other words, in this state, the black nonpolar liquid 35 concentrates to a maximum extent in a portion of the rib pixel or the light-transmitting surface orthogonal to the light-transmitting direction, which is the up-and-down direction in FIG. 5. Then, most of the remaining portion of the rib pixel is filled with the layer of the polar liquid 36 which is colorless and transparent. That is, a portion where the nonpolar liquid 35 is not present constitutes the greatest part of the light-transmitting surface. Therefore, most of the light 51 or visual information from the light-emitting source 11 is transmitted through a portion where only the layer of the polar liquid 36 is present and the layer of the black nonpolar liquid 35 is not present, the portion being in the rib pixel of the liquid device 21. Then, without being blocked, the light 51 is emitted as transmitted light 52 from the image display surface, which is positioned at the front of the liquid device 21 and illustrated on the upper side in FIG. 5. Here, the maximum intensity of the transmitted light 52 from the liquid device 21 is obtained.

Since the level of voltage applied across the lower electrode 32 and the upper electrode 37 is changed according to the level of supply voltage of the power supply 41, the amount of deformation of the nonpolar liquid 35 is changed as a result. Therefore, by controlling the level of supply voltage of the power supply 41, the image display unit driver 12 can stabilize the shape of the nonpolar liquid 35 in a state between those illustrated in FIG. 4 and FIG. 5. In other words, the image display unit driver 12 can control the intensity of light transmitted through the corresponding liquid device 21, that is, the degree of opening of the optical shutter.

As described above, the liquid device 21 controls the amount of light emitted from the light-emitting source 11 and transmitted through the liquid device 21 itself. In other words, the liquid device 21 operates as an optical shutter that can change the intensity of light from the light-emitting source 11 to any level.

Although FIG. 5 illustrates the nonpolar liquid 35 which collects near the rib 34-2 when the supply voltage of the power supply 41 is applied across the lower electrode 32 and the upper electrode 37, the nonpolar liquid 35 may be moved to any position. That is, it is only necessary that the nonpolar liquid 35 spread over the entire bottom surface (i.e., the surface adjacent to the insulator 33) in the rib pixel when no supply voltage of the power supply 41 is applied across the lower electrode 32 and the upper electrode 37, and collect in a portion of the light-transmitting surface in the rib pixel when the supply voltage of the power supply 41 is applied across the lower electrode 32 and the upper electrode 37.

In practice, the nonpolar liquid 35 does not necessarily "expand" or "contract" in response to the application of a voltage across the lower electrode 32 and the upper electrode 37. However, hereinafter, spreading of the nonpolar liquid 35 over the entire light-transmitting surface in the rib pixel (see FIG. 4) will be referred to as "expansion", while collection of the nonpolar liquid 35 into a portion of the light-transmitting surface in the rib pixel (see FIG. 5) will be referred to as "contraction". That is, the nonpolar liquid 35 "expands" if a voltage applied across the lower electrode 32 and the upper electrode 37 is reduced or becomes zero, while the nonpolar liquid 35 "contracts" if a voltage applied across the lower electrode 32 and the upper electrode 37 is increased.

Figure 6:
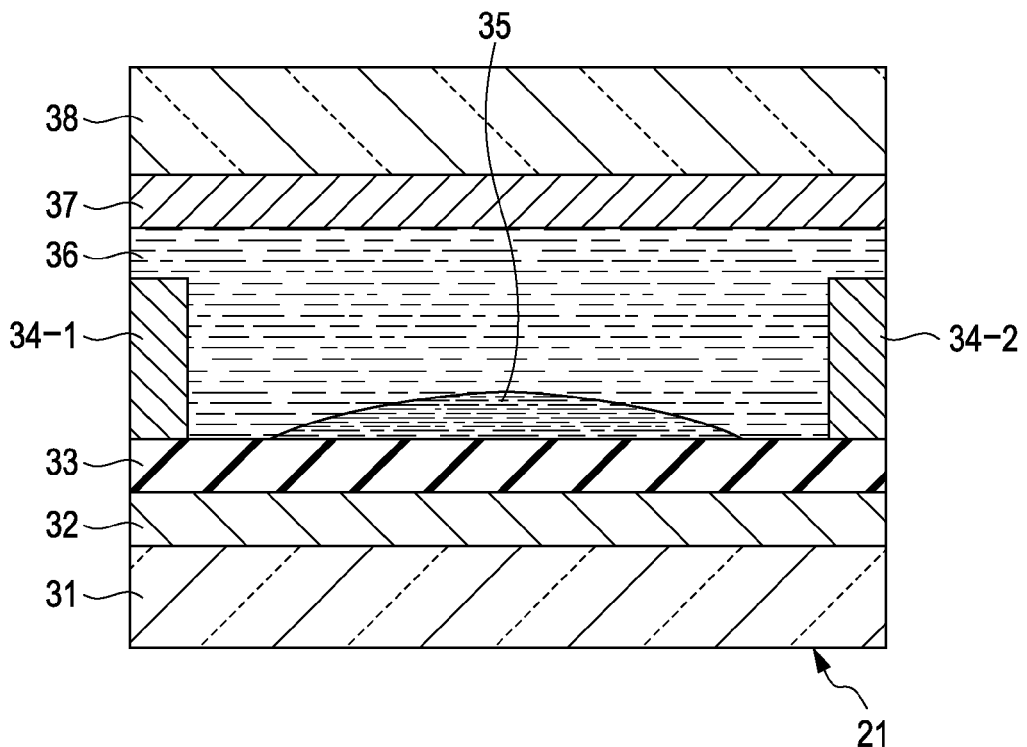
FIG. 6 illustrates the amount of nonpolar liquid.

The amount of the nonpolar liquid 35 is controllable by adjusting the height of the rib 34 as described below. It is desirable that the amount of the nonpolar liquid 35 be appropriate, not be either too large or too small, with respect to the area of the light-transmitting surface in the rib pixel of the liquid device 21. For example, as illustrated in FIG. 6, if the amount of the nonpolar liquid 35 is too small, even when no voltage is applied across the lower electrode 32 and the upper electrode 37, the nonpolar liquid 35 does not fully expand and does not spread over the entire light-transmitting surface in the rib pixel. This means that there may be a portion where the layer of the nonpolar liquid 35 is not present with respect to a light path. That is, despite the fact that the optical shutter is in a closed mode, a gap may be created in the optical shutter and light may be transmitted therethrough.

Figure 7:
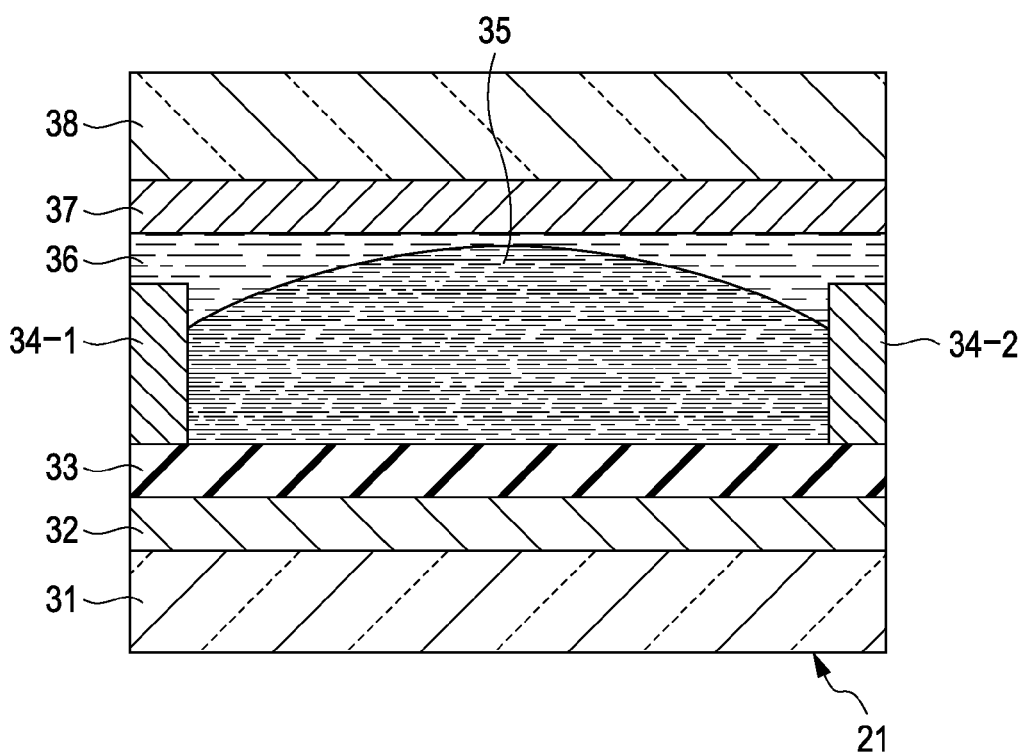
FIG. 7 also illustrates the amount of nonpolar liquid.

On the other hand, as illustrated in FIG. 7, if the amount of the nonpolar liquid 35 is too large, even when a maximum voltage within an allowable range is applied by the power supply 41 across the lower electrode 32 and the upper electrode 37, the nonpolar liquid 35 does not fully contract and does not collect in a portion of the light-transmitting surface in the rib pixel. This means that the light-transmitting surface in the rib pixel may be entirely covered with the layer of the nonpolar liquid 35 or the area of a portion where no layer of the nonpolar liquid 35 is present may be too small for the entire light-transmitting surface. That is, despite the fact that the optical shutter is in an open mode, the shutter may not be fully opened and may not be able to fully allow light to pass through.

Figure 8:
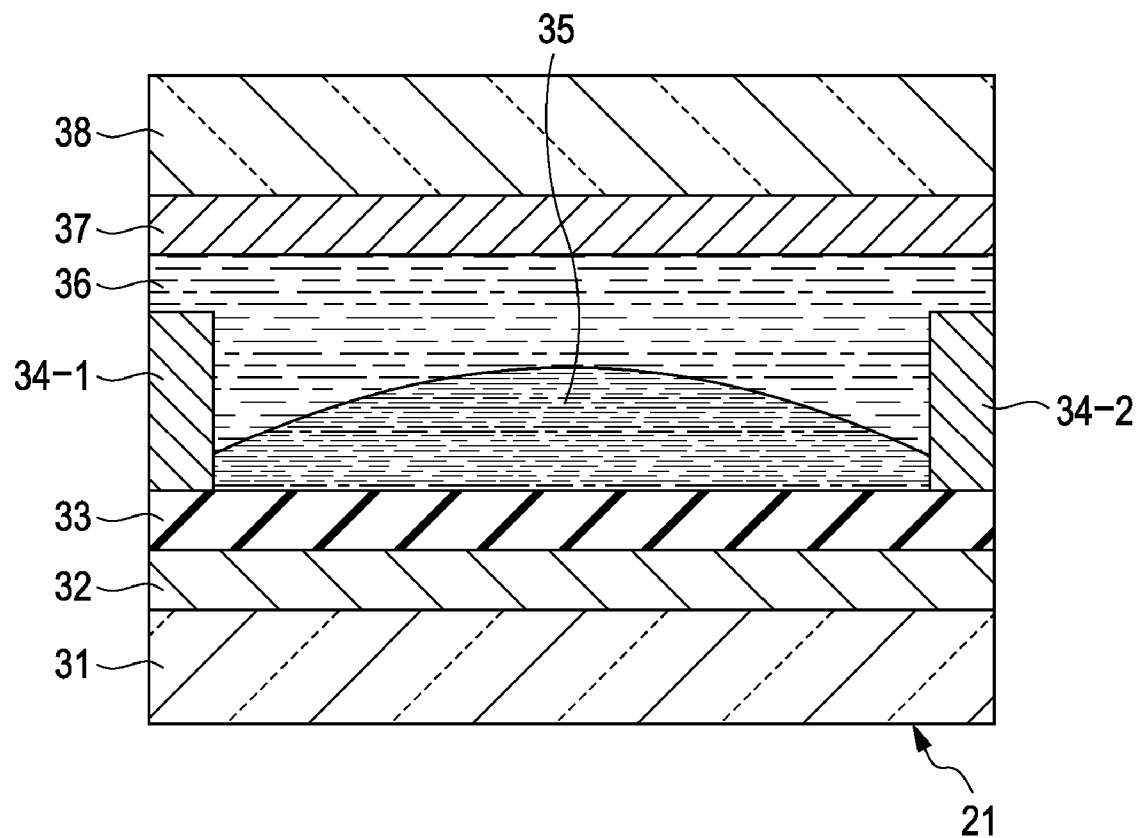
FIG. 8 also illustrates the amount of nonpolar liquid.

Therefore, it is desirable that the amount of the nonpolar liquid 35 be set to a value which allows the nonpolar liquid 35 to fully expand and allows light transmittance to be sufficiently reduced when no voltage is applied across the lower electrode 32 and the upper electrode 37, and allows the nonpolar liquid 35 to fully contract and allows light transmittance to be sufficiently increased when a maximum voltage within an allowable range is applied across the lower electrode 32 and the upper electrode 37. In other words, it is desirable that the amount of the nonpolar liquid 35 be set to a value (e.g., see FIG. 8) such that there is a significant change in light transmittance between the two modes described above.

It is desirable that the response speed of the liquid device 21 and the speed of transition between the two modes described above (i.e., the speed of expansion and contraction of the nonpolar liquid 35) be as fast as possible. Therefore, it is desirable that the amount and viscosity of the nonpolar liquid 35 be as small as possible within a range which allows a significant change in light transmittance between the two modes described above.

The necessary amount of the nonpolar liquid 35 varies depending on the area of the light-transmitting surface, that is, the area of a horizontal surface of the rib pixel (hereinafter referred to as pixel size). Basically, all other things being equal, the greater the pixel size, the more the necessary degree of expansion and the necessary amount of the nonpolar liquid 35. Conversely, the smaller the pixel size, the less the necessary degree of expansion and the necessary amount of the nonpolar liquid 35 and thus the higher the response speed of the liquid device 21.

FIG. 9 is a graph showing a relationship between the pixel size and a response critical frequency. The horizontal axis represents the pixel size (μm) and the vertical axis represents a response critical frequency (Hz). A response critical frequency is the highest possible frequency that allows expansion of the nonpolar liquid 35 over the entire bottom surface of the rib pixel. FIG. 9 shows cases where a voltage of 20 V (indicated by while squares) and a voltage of 30 V (indicated by black triangles) are applied across the lower electrode 32 and the upper electrode 37.

In either case, the response critical frequency for a pixel size of 20 (μm) by 20 (μm) is higher than that for a pixel size of 35 (μm) by 35 (μm). That is, the smaller the pixel size, the higher the response speed of the liquid device 21. This is because the smaller the pixel size, the smaller the expansion area (i.e., the necessary degree of expansion) and the necessary amount of the nonpolar liquid 35.

Thus, reducing the pixel size can increase the response speed of the liquid device 21. That is, with a rib pixel having a sufficiently small size, the liquid device 21 can provide a response speed that fully satisfies a required level.

At present, in a device, such as a liquid crystal display (LCD), which includes thin film transistors (TFTs), it is technically difficult to reduce the size of a single pixel and is not necessarily possible to reduce the pixel size to about 35 μm. However, if a single conventional pixel is divided into sub-pixels each having a desired size, it is possible to achieve effects similar to those of the original pixel.

Unlike a conventional optical shutter, the liquid device 21 does not require a polarizing filter or the like. Therefore, the efficiency of light extraction in the liquid device 21 is much higher than that in such a conventional optical shutter. That is, the liquid device 21 is capable of operating at higher speeds and providing improved light extraction efficiency. Moreover, as shown in FIG. 9, the liquid device 21 can operate at a drive voltage of 30 V or below, which is lower than that of a conventional optical shutter.

The amount of the nonpolar liquid 35 is controlled by the height of the rib 34, processing time of ultraviolet/ozone treatment applied to the surface of the rib 34, and material of each member. A method for manufacturing the liquid device 21 will be described in detail below. To control the surface tension of the rib 34, ultraviolet/ozone treatment is applied to the surface of the rib 34 before application of the nonpolar liquid 35 thereto. Since the surface tension of the rib 34 varies depending on the processing time of this ultraviolet/ozone treatment, the amount of the nonpolar liquid 35 can also be controlled.

As described above, the upper and lower limits of the necessary amount of the nonpolar liquid 35 vary depending on the pixel size. More specifically, the smaller the pixel size, the smaller the upper and lower limit values. In other words, the smaller the pixel size, the lower the height of the rib 34 and the shorter the processing time of ultraviolet/ozone treatment. That is, if manufacturing methods (or manufacturing apparatuses) and materials used are equal, reducing the pixel size makes it possible to reduce costs and time for manufacturing the liquid device 21 and ease the manufacturing process.

FIG. 10 is a table showing a relationship of the height of the rib 34, the pixel size, and recommended processing time of ultraviolet/ozone treatment. In the example of FIG. 10, the rib 34 is made of SU-8 that is an ultra-pressure membrane chemically-amplified negative resist, the nonpolar liquid 35 is dodecane, the polar liquid 36 is water, and the insulator 33 is made of CYTOP of grade AP2.

As shown in FIG. 10, for example, if the pixel size is 115 μm by 115 μm, a rib height of greater than or equal to 8 μm is necessary; if the pixel size is 75 μm by 75 μm, a rib height of greater than or equal to 3 μm is necessary; and if the pixel size is 35 μm by 35 μm or 21 μm by 21 μm, the rib height may be as small as 2 μm. The higher the height of the rib 34, the longer the processing time of ultraviolet/ozone treatment.

Although not shown, for example, if the pixel size is 115 μm by 115 μm, the upper limit of the rib height is about 20 μm and the necessary processing time of ultraviolet/ozone treatment is about 10 minutes; if the pixel size is 75 μm by 75 μm or 35 μm by 35 μm, the upper limit of the rib height is about 20 μm and the necessary processing time of ultraviolet/ozone treatment is about 7 to 8 minutes; and if the pixel size is 21 μm by 21 μm, the upper limit of the rib height is about 8 μm.

As described above, the smaller the pixel size, the lower the upper and lower limits of the height of the rib 34. However, there is a limit to the lowest rib height achievable by manufacturing techniques. In other words, there is a lower limit to the height of the rib 34 that can be formed by a manufacturing apparatus for manufacturing the liquid device 21. Therefore, if the pixel size is reduced to a certain level, there is virtually no need to consider the lower limit of the height of the rib 34. For example, in the table of FIG. 10, if a manufacturing apparatus for manufacturing the liquid device 21 is capable of forming only the rib 34 with a height of 2 μm or above and when the pixel size is 115 μm by 115 μm or 75 μm by 75 μm, it is necessary to calculate, in the process of designing the liquid device 21, a lower limit of the height of the rib 34 and the recommended processing time of ultraviolet/ozone treatment. For a pixel size of 35 μm by 35 μm or 21 μm by 21 μm, however, the lowest height of the rib 34 is limited to 2 μm by the manufacturing apparatus. This can eliminate the need for the above calculation and make it easy to design the liquid device 21.

That is, if manufacturing methods (or manufacturing apparatuses) and materials used are equal, reducing the pixel size to a value smaller than a predetermined value makes it easy to design the liquid device 21.

Next, manufacturing of the image display unit 13 will be described.

Figure 11:
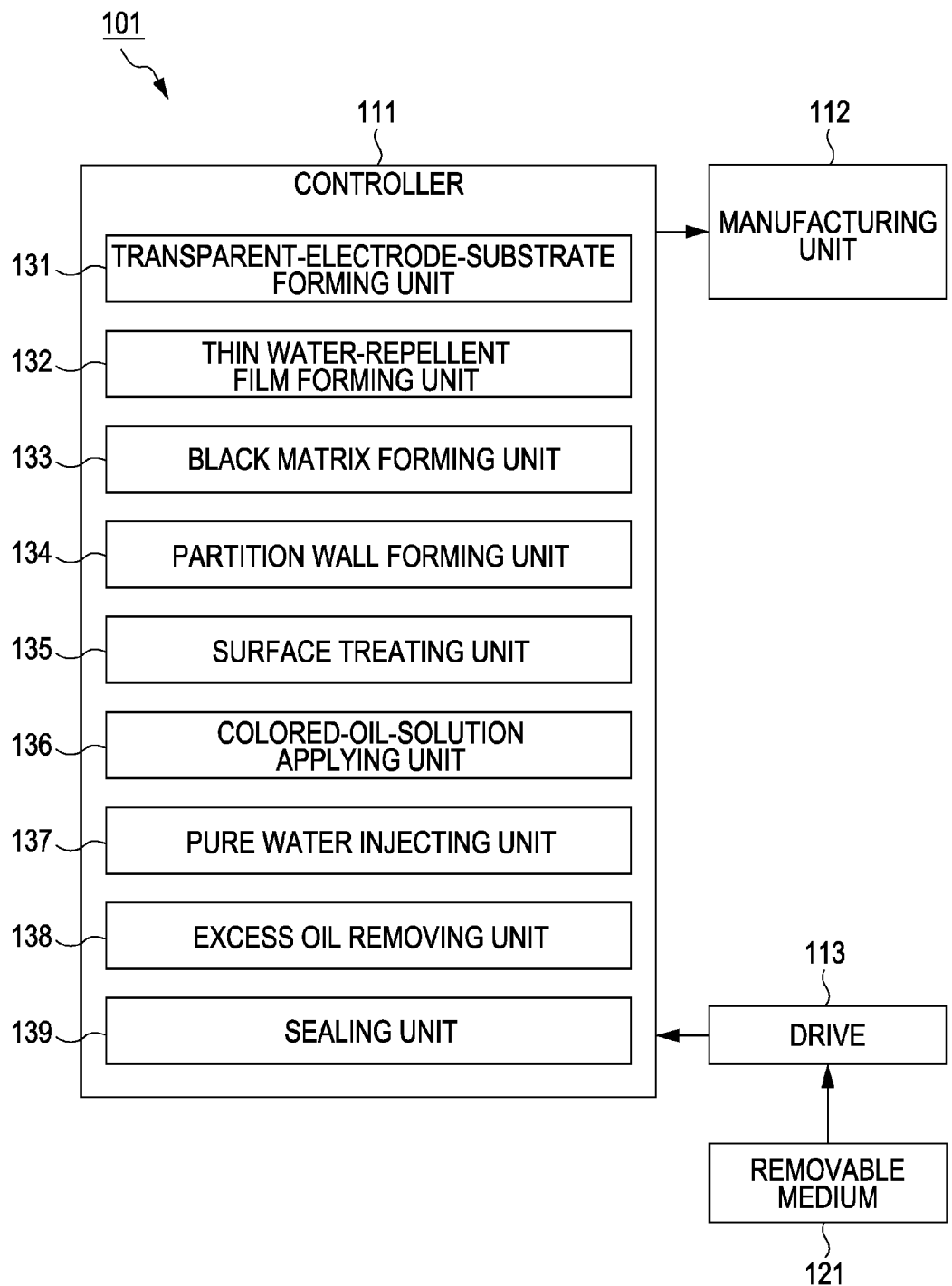
FIG. 11 is a block diagram illustrating an exemplary configuration of an apparatus for manufacturing liquid devices.

FIG. 11 is a block diagram illustrating an exemplary configuration of major components of a manufacturing apparatus for manufacturing the image display unit 13.

Referring to FIG. 11, a manufacturing apparatus 101 for manufacturing the image display unit 13 includes a controller 111, a manufacturing unit 112, and a drive 113. The controller 111 is a processor that controls the operation of the manufacturing unit 112 that actually manufactures the image display unit 13. The controller 111 includes components that control operations in respective steps of manufacturing the image display unit 13. Specifically, the controller 111 includes a transparent-electrode-substrate forming unit 131 which forms a substrate with a transparent electrode, a thin water-repellent film forming unit 132, a black matrix forming unit 133, a partition wall forming unit 134, a surface treating unit 135, a colored-oil-solution applying unit 136, a pure water injecting unit 137, an excess oil removing unit 138, and a sealing unit 139.

A predetermined removable medium 121 is attached to the drive 113 as necessary. The drive 113 reads various types of information, such as information about the control of the manufacturing unit 112, from the removable medium 121 and supplies the read information to the controller 111. The controller 111 uses this information to control the manufacturing unit 112. That is, the controller 111 has a storage medium for storing information, uses the removable medium 121 attached to the drive 113 to obtain and store the most up-todate information, and thus controls the manufacturing unit 112 on the basis of the most up-to-date information.

Figure 12:
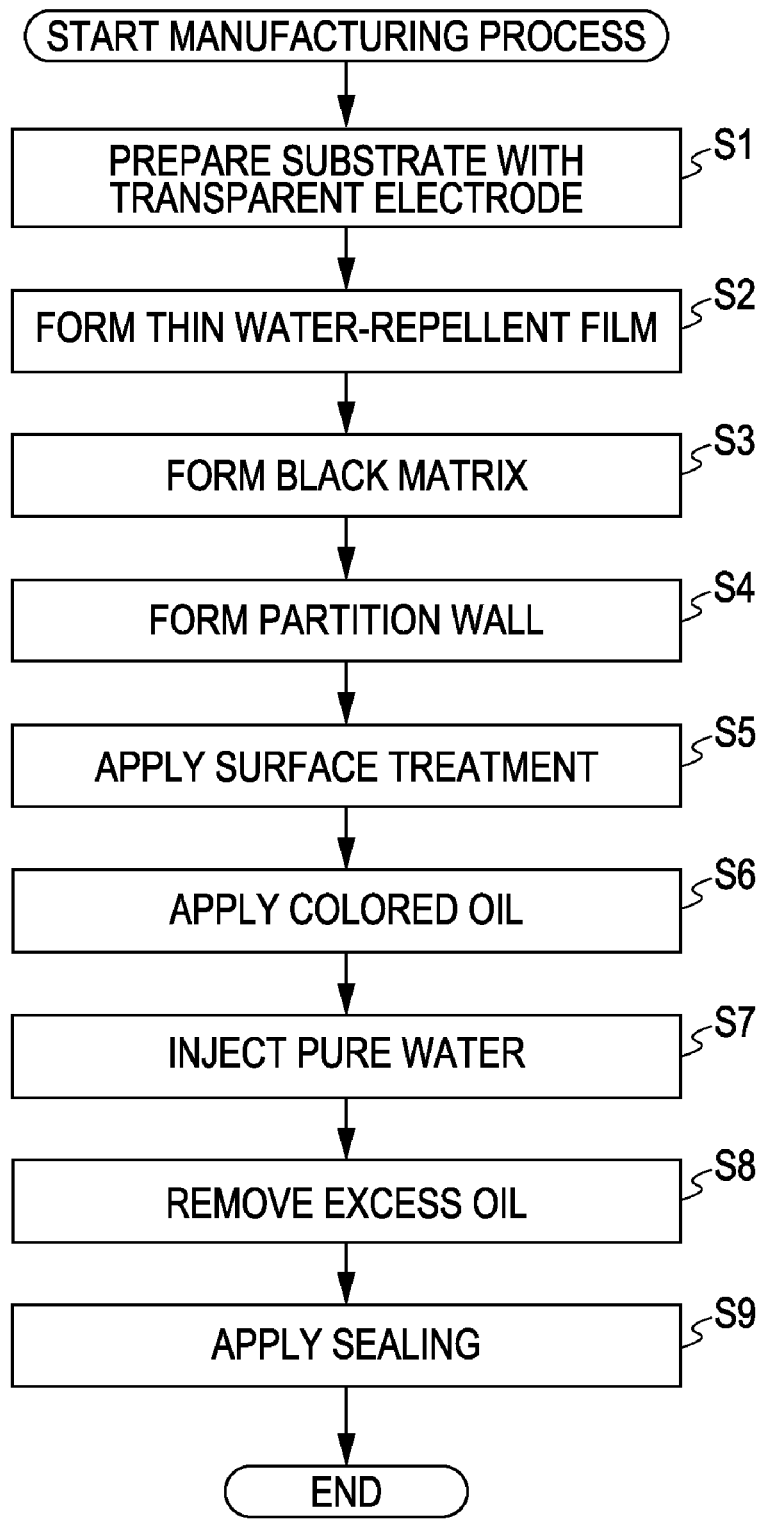
FIG. 12 is a flowchart showing an exemplary flow of a manufacturing process.

FIG. 12 is a flowchart showing an exemplary flow of a manufacturing process carried out by each processing unit in the controller 111. The following description will be made with reference to FIG. 12, and also to FIG. 13 to FIG. 21 as necessary.

Figure 13:
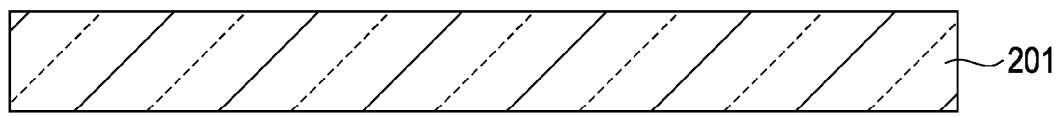
FIG. 13 illustrates a step of manufacturing liquid devices.

Upon start of the manufacturing process, in step S1, the transparent-electrode-substrate forming unit 131 in the controller 111 controls the manufacturing unit 112 such that a transparent member of glass, silicon, or the like is prepared as the lower substrate 31, and a transparent electrode, such as an ITO film, is formed as the lower electrode 32 on the lower substrate 31. Thus, as illustrated in FIG. 13, a transparent electrode substrate 201 which is transparent and has a predetermined size is produced. The description about the upper substrate 38 and upper electrode 37 will be omitted, as they are produced in a manner similar to that in the case of the lower substrate 31 and lower electrode 32 described above.

Figure 14:
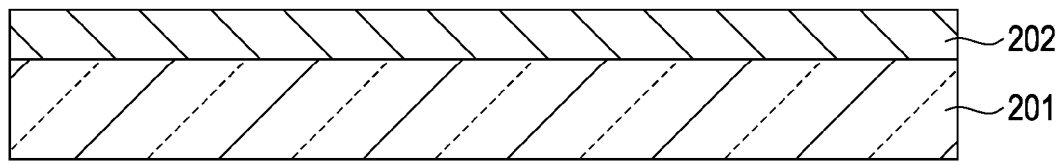
FIG. 14 illustrates another step of manufacturing the liquid devices.

After the transparent electrode substrate 201 is produced, the thin water-repellent film forming unit 132 controls the manufacturing unit 112, in step S2, to form a thin film 202 with water-repellent properties on the transparent electrode substrate 201, as illustrated in FIG. 14. Methods for forming the thin film 202 can be broadly divided into two methods: a wet method and a dry method. Examples of the wet method include spin coating and dip coating which involve the use of a solution in which water-repellent material is dissolved. Examples of the wet method also include screen printing. Examples of the dry method include evaporation. The necessary thickness of the water-repellent film is about 100 nm to 1000 nm. In terms of drive performance, the thinner the water-repellent film, the lower the voltage at which the water-repellent film can operate. However, in practice, since application of a voltage tends to cause dielectric breakdown, the water-repellent film needs to be thick to a certain extent (e.g., about 150 µm).

Where necessary, the thin water-repellent film forming unit 132 may reform the surface of the water-repellent film or apply, to the water-repellent surface, a general-purpose resist agent to which a surfactant has been added. Examples of the above-described dry method further include ultraviolet/ozone treatment and oxygen plasma ashing. Since excessive surface treatment may destroy water-repellent properties that are necessary, it is desirable that the above-described surface treatment be performed to a minimum extent necessary.

After the thin film 202 having water-repellent properties is formed on the transparent electrode substrate 201, the black matrix forming unit 133 controls the manufacturing unit 112, in step S3, to form a black matrix with a photolithographic method. The black matrix optically separates rib pixels in a manner which does not allow entry of excessive light. Specifically, the black matrix forming unit 133 controls the manufacturing unit 112 to perform resist application, exposure, and development according to a spin coating method. Thus, for example, as illustrated in FIG. 15, partition walls 203-1 to 203-4 composed of a black resist containing a black pigment or dye are formed as a black matrix on the thin film 202.

Figure 15:
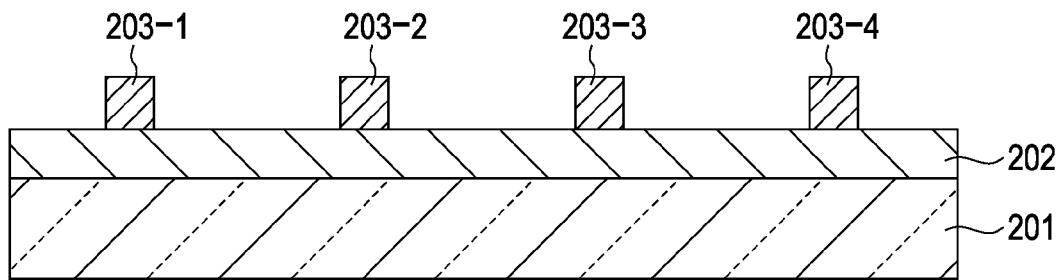
FIG. 15 illustrates another step of manufacturing the liquid devices.

Although FIG. 15 illustrates the partition walls 203-1 to 203-4 as four separate parts, the partition walls 203-1 to 203-4 are actually formed in a mesh-like pattern. Therefore, the partition walls 203-1 to 203-4 are actually connected to each other and formed as a single member. Hereinafter, when there is no need to individually describe the partition walls 203-1 to 203-4, they are referred to as a partition wall 203.

Figure 16:
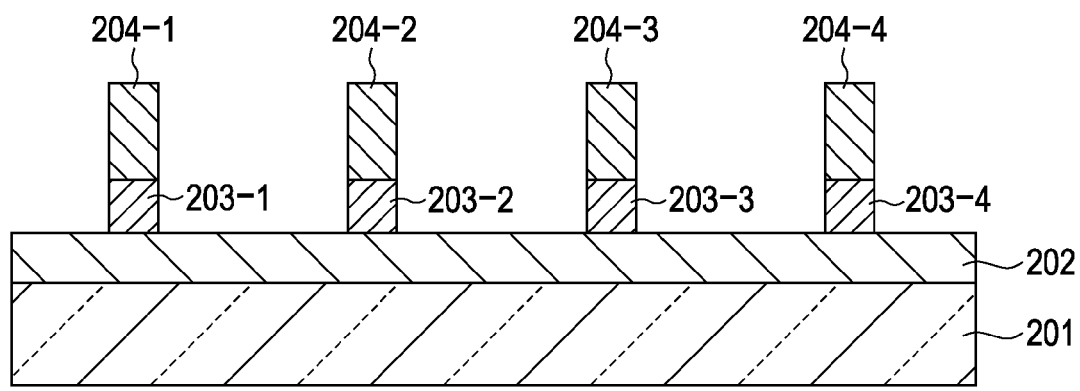
FIG. 16 illustrates another step of manufacturing the liquid devices.

Generally, the upper limit of the film thickness of this black matrix is about 1 µm to 2 µm. Therefore, in step S4, the partition wall forming unit 134 controls the manufacturing unit 112 to perform resist application, exposure, and development according to the spin coating method. Thus, for example, as illustrated in FIG. 16, partition walls 204-1 to 204-4 are formed on the partition walls 203-1 to 203-4, respectively. The partition walls 204-1 to 204-4 are composed of a resist material, such as SU-8, from which partition walls can be formed with a high aspect ratio.

The partition walls 204-1 to 204-4 are also actually formed in a mesh-like pattern, connected to each other, and produced as a single member. Again, hereinafter, when there is no need to individually describe the partition walls 204-1 to 204-4, they are referred to as a partition wall 204.

The height of the partition wall 204 can be adjusted (i.e., a partition wall of a desired height can be formed) by forming the partition wall 204 of, for example, SU-8 on the partition wall 203 formed as a black matrix. The partition wall 204 may be composed of a resist of epoxy resin and formed by a known photolithographic technique or the like. If a fluoride compound material is used to form the insulator 33, a resist material may be repelled from the surface of the fluoride compound film due to the wettability of the insulator 33. However, this can be avoided by an improved manufacturing process.

The height of the partition wall 204 can be controlled by adjusting the density of the resist. For example, if SU-8 is used to form the partition wall 204, the density of the resist is adjusted in advance using cyclopentanone, which is a prime solvent, according to the desired thickness of the partition wall 204.

Figure 17:
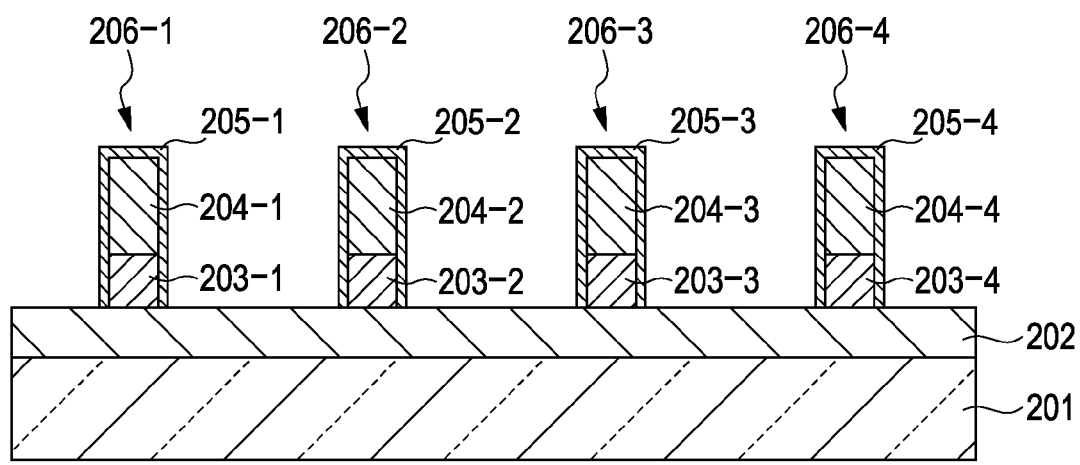
FIG. 17 illustrates another step of manufacturing the liquid devices.
Figure 18:
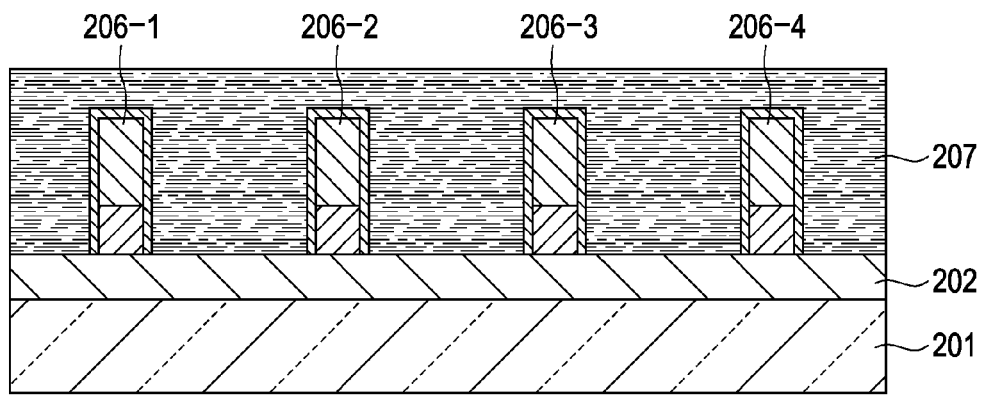
FIG. 18 illustrates another step of manufacturing the liquid devices.
Figure 19:
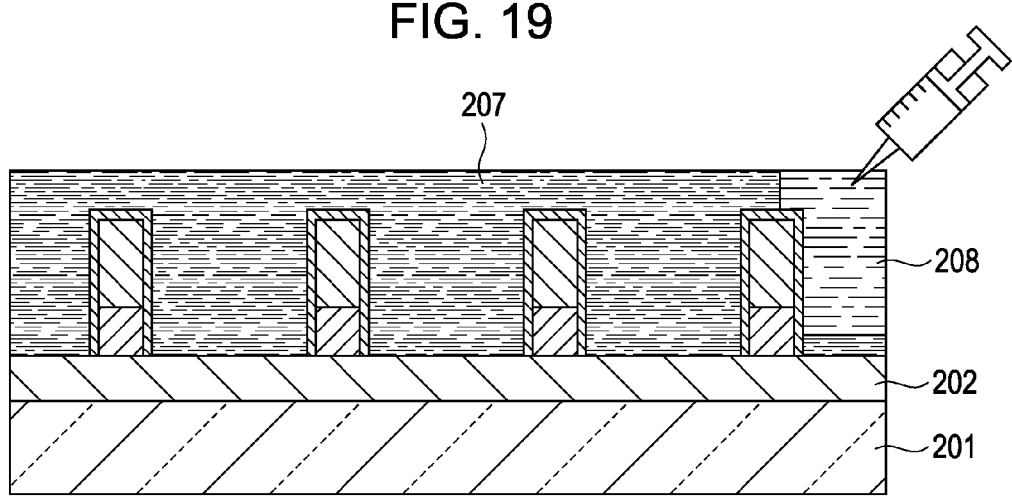
FIG. 19 illustrates another step of manufacturing the liquid devices.

Upon formation of the partition wall 204, in step S5, the surface treating unit 135 uses a dry method, such as ultraviolet/ozone treatment or oxygen plasma ashing, to apply surface treatment to the partition walls 203 and 204 formed as described above. For example, as illustrated in FIG. 17, the surface treating unit 135 applies surface treatments 205-1 to 205-4 to the partition walls 203-1 to 203-4 and to the partition walls 204-1 to 204-4, respectively. Hereinafter, when there is no need to individually describe the surface treatments 205-1 to 205-4, they are referred to as a surface treatment 205.

Hereinafter, the partition wall 203-1 and partition wall 204-1 to which the surface treatment 205-1 is applied are collectively referred to as a rib 206-1, the partition wall 203-2 and partition wall 204-2 to which the surface treatment 205-2 is applied are collectively referred to as a rib 206-2, the partition wall 203-3 and partition wall 204-3 to which the surface treatment 205-3 is applied are collectively referred to as a rib 206-3, and the partition wall 203-4 and partition wall 204-4 to which the surface treatment 205-4 is applied are collectively referred to as a rib 206-4. When there is no need to individually describe the rib 206-1 to 206-4, they are referred to as a rib 206.

With this surface treatment 205, the wettability of the rib 206 with respect to the polar liquid 36 can be controlled.

Upon completion of the surface treatment on the rib 206, to maintain a distance between the lower electrode 32 and the upper electrode 37 at a predetermined value, a gap forming material is sprayed on an outer edge of the transparent electrode substrate 201, that is, on a region around a portion of the lower substrate 31 on which the lower electrode 32 is placed. For example, a mixture of adhesive with silica spheres or a sealing adhesive is used as the gap forming material. Although not shown, the gap forming material is generally sprayed such that it is made higher than the rib 206.

Upon formation of the rib 206, in step S6, the colored-oil-solution applying unit 136 controls the manufacturing unit 112 to apply an oil solution 207 colored in black (e.g., see FIG. 18) to the entire surface of the transparent electrode substrate 201 such that the oil solution 207 is filled as the nonpolar liquid 35 in each rib pixel. For example, the oil solution 207 is a colored ink solution which is immiscible with water and contains a dye or pigment.

Upon application of the oil solution 207, in step S7, the pure water injecting unit 137 controls the manufacturing unit 112 to inject (e.g., see FIG. 19) pure water 208 as the polar liquid 36 toward the surface of the transparent electrode substrate 201 covered with the colored oil solution 207. During injection of the pure water 208, the speed at which the pure water 208 spreads along the surface of the transparent electrode substrate 201 is made constant by use of a dispenser or the like. Alternatively, a substrate covered with oil may be immersed at a constant speed and angle into a water tank filled with pure water.

For example, since injection of the pure water 208 with a dispenser causes excess colored oil to partially float, the floating oil needs to be removed. In step S8, the excess oil removing unit 138 controls the manufacturing unit 112 to remove excess oil floating on the pure water 208.

Figure 20:
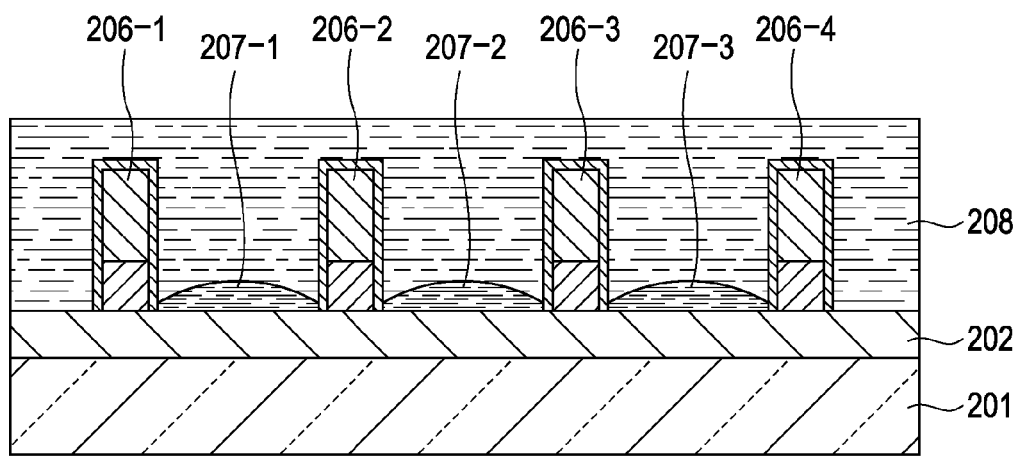
FIG. 20 illustrates another step of manufacturing the liquid devices.
Figure 21:
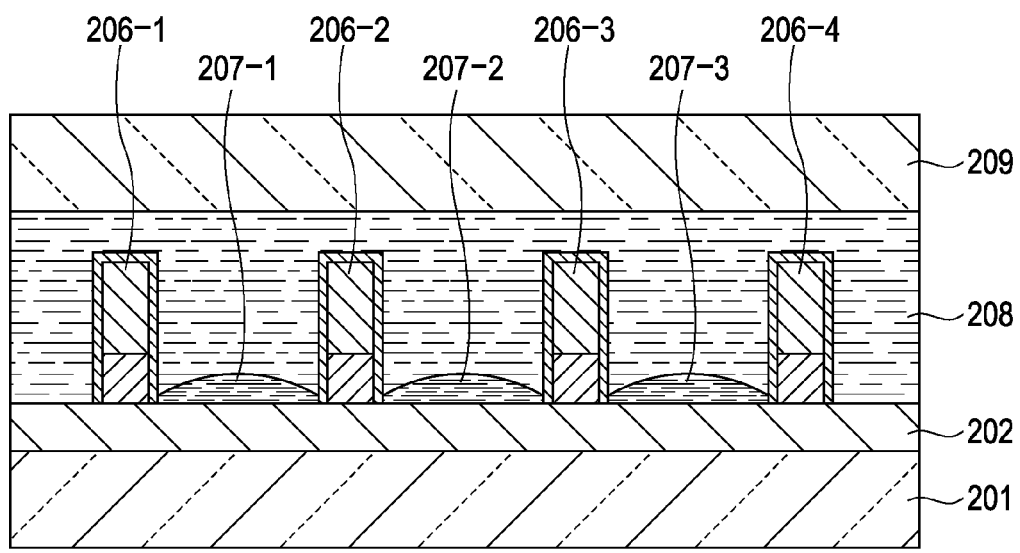
FIG. 21 illustrates another step of manufacturing the liquid devices.

FIG. 20 illustrates a state after the removal of such excess oil. As illustrated in FIG. 20, after injection of the pure water 208 and removal of excess oil, a proper amount of oil solution 207-1 forms a layer in the rib pixel between the rib 206-1 and the rib 206-2, a proper amount of oil solution 207-2 forms a layer in the rib pixel between the rib 206-2 and the rib 206-3, and a proper amount of oil solution 207-3 forms a layer in the rib pixel between the rib 206-3 and the rib 206-4. Thus, a layer of the oil solution 207 and a layer of the pure water 208 are formed in each rib pixel. Because of the wettability of the rib 206, regardless of the specific gravity between the polar liquid 36 and nonpolar liquid 35, the nonpolar liquid 35 and the polar liquid 36 form layers on the lower and upper sides, respectively, and then become stable.

After removal of excess oil, in step S9, the sealing unit 139 controls the manufacturing unit 112 to bond a transparent electrode substrate 209 (e.g., see FIG. 21) above the polar liquid 36 to the transparent electrode substrate 201, with the gap forming material therebetween, such that the transparent electrode substrate 209 is positioned opposite the transparent electrode substrate 201. Then, the sealing unit 139 controls the manufacturing unit 112 to seal the outer edge of the resulting panel with a sealing resin. Examples of the sealing resin include ionomer and adhesive polyethylene.

Upon completion of the sealing, the manufacturing process ends.

Thus, the manufacturing apparatus 101 manufactures the image display unit 13.

The image display apparatus 1 of FIG. 1 is capable of partially allowing or blocking transmission of light from the light-emitting source 11, with respect to the entire surface of the image display surface, by opening and closing the optical shutter in each liquid device 21. Thus, the image display apparatus 1 can display, on the image display surface, a so-called binary image expressed in only two colors according to the presence or absence of light transmitted through each liquid device 21. For example, if the light-emitting source 11 emits white light, there is displayed on the image display surface a binary image in which a portion corresponding to a liquid device 21 where the optical shutter is opened is expressed in white and a portion corresponding to a liquid device 21 where the optical shutter is closed is expressed in black.

Additionally, the image display apparatus 1 is capable of controlling, arbitrarily or stepwise, the degree of opening and closing of the optical shutter in each liquid device 21. The image display apparatus 1 is also capable of controlling, arbitrarily or stepwise, the length of time during which the optical shutter in an opened state in each liquid device 21. Thus, the image display apparatus 1 can control the transmittance of light through each liquid device 21 arbitrarily or stepwise and can display, on the image display surface, a so-called gray-scale image expressed in variations of the intensity of light transmitted through each liquid device 21. For example, if the light-emitting source 11 emits white light, a gray-scale image containing white, black, and shades of gray in between is displayed on the image display surface.

Alternatively, the image display apparatus 1 may be configured to display a so-called color image which is expressed, for example, with red, green, and blue colors on the image display surface. For example, as illustrated in FIG. 22, by making the color of the nonpolar liquid 35 in each liquid device 21 of the image display unit 13 red, green, or blue, a color image can be displayed on the image display surface.

Figure 22:
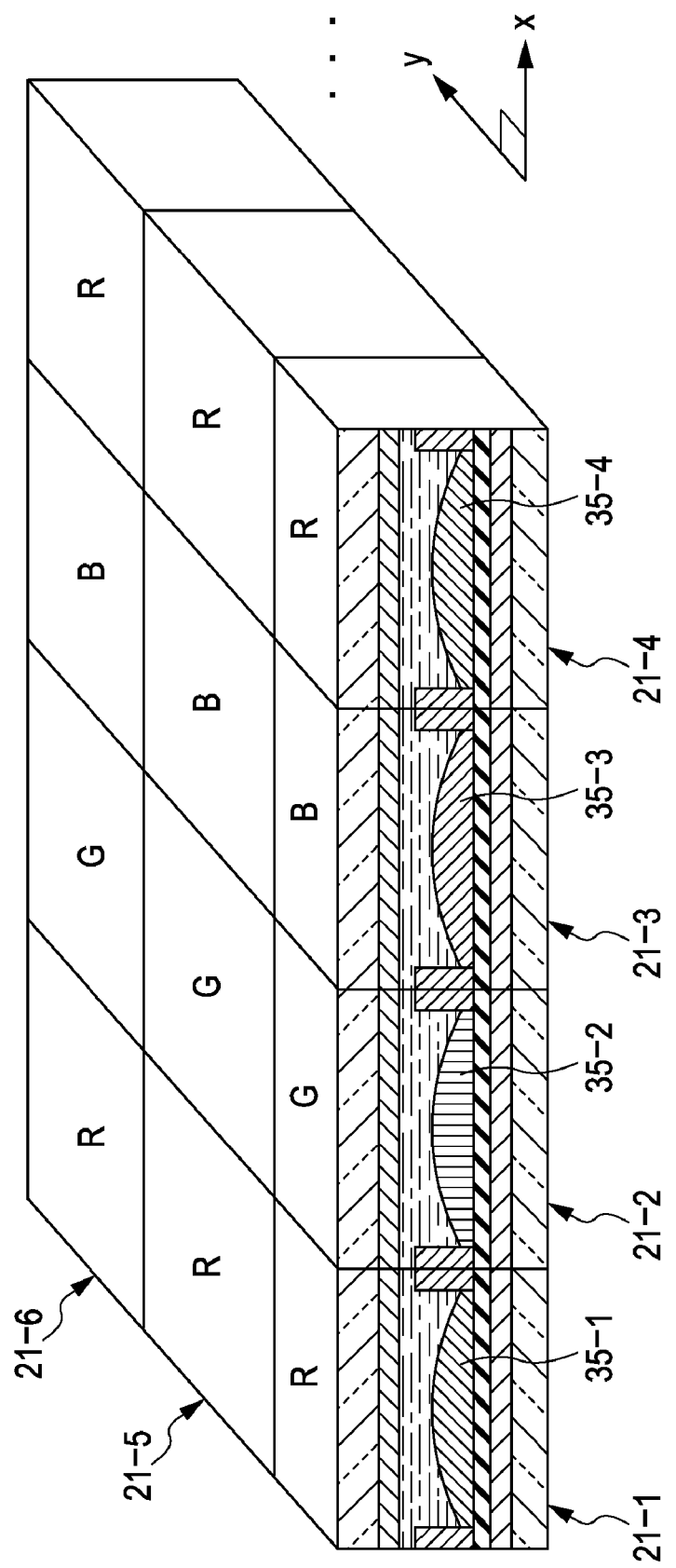
FIG. 22 illustrates another exemplary arrangement of liquid devices.

FIG. 22 corresponds to FIG. 3 and illustrates an exemplary arrangement of liquid devices when liquid devices to which the present application is applied are included in an image display apparatus capable of displaying a color image. Although the arrangement of the liquid devices 21 illustrated in FIG. 22 is the same as that illustrated in FIG. 3, the color of the nonpolar liquid 35 in each liquid device 21 of FIG. 22 is read, green, or blue, but not black. For example, a nonpolar liquid 35-1 in the liquid device 21-1 and a nonpolar liquid 35-4 in the liquid device 21-4, the nonpolar liquid 35-1 and nonpolar liquid 35-4 being indicated by diagonal lines running from bottom-left to top-right, are red in color; a nonpolar liquid 35-2 indicated by vertical lines in the liquid device 21-2 is green in color; and a nonpolar liquid 35-3 indicated by diagonal lines running from top-left to bottom-right in the liquid device 21-3 is blue in color.

Also in FIG. 22, the nonpolar liquids 35 in the liquid devices 21 marked with the letter "R" on the top surface (such as the liquid device 21-5 and the liquid device 21-6) are red in color; the nonpolar liquids 35 in the liquid devices 21 marked with the letter "G" on the top surface are green in color; and the nonpolar liquids 35 in the liquid devices 21 marked with the letter "B" on the top surface are blue in color. That is, in the example of FIG. 22, the liquid devices 21 are arranged such that the nonpolar liquids 35 of the same color are arranged in the Y direction, while the "red", "green", and "blue" nonpolar liquids 35 are repetitively arranged in this order in the X direction. The colors of the nonpolar liquids 35 in the liquid devices 21 in an array may be arranged in any manner. For example, the colors may be arranged in a Bayer pattern and do not necessarily need to be arranged in the manner illustrated in FIG. 22. The number of colors of the nonpolar liquids 35 may be two, four, or more.

The letters "R", "G", "B" in FIG. 22 are provided for illustrative purposes only and not printed on the actual liquid devices 21.

As illustrated in the example of FIG. 22, when the color of a nonpolar liquid 35 in a liquid device 21 is red, green, or blue but not black, in other words, if the nonpolar liquid 35 is made of a red, green, or blue material, if a red, green, or blue dye is dissolved in the nonpolar liquid 35, or if a red, green, or blue pigment is mixed with the nonpolar liquid 35, the liquid device 21 allows light from the light-emitting source 11 to pass through even when the nonpolar liquid 35 expands.

That is, the nonpolar liquid 35 is transparent in the present case. Therefore, of light from the light-emitting source 11, light of a predetermined wavelength, that is, light with the same color as that of the nonpolar liquid 35 can be transmitted through the liquid device 21. Since light beams from adjacent liquid devices 21 overlap one another, it appears to the user that a displayed image contains other colors in addition to red, green, and blue.

In this case, the liquid device 21 only changes the color of light from the light-emitting source 11, and does not block light from the light-emitting source 11. Therefore, since the number of components in the liquid device 21 is as small as that in the case of FIG. 3, it is possible to reduce the manufacturing cost.

Figure 23:
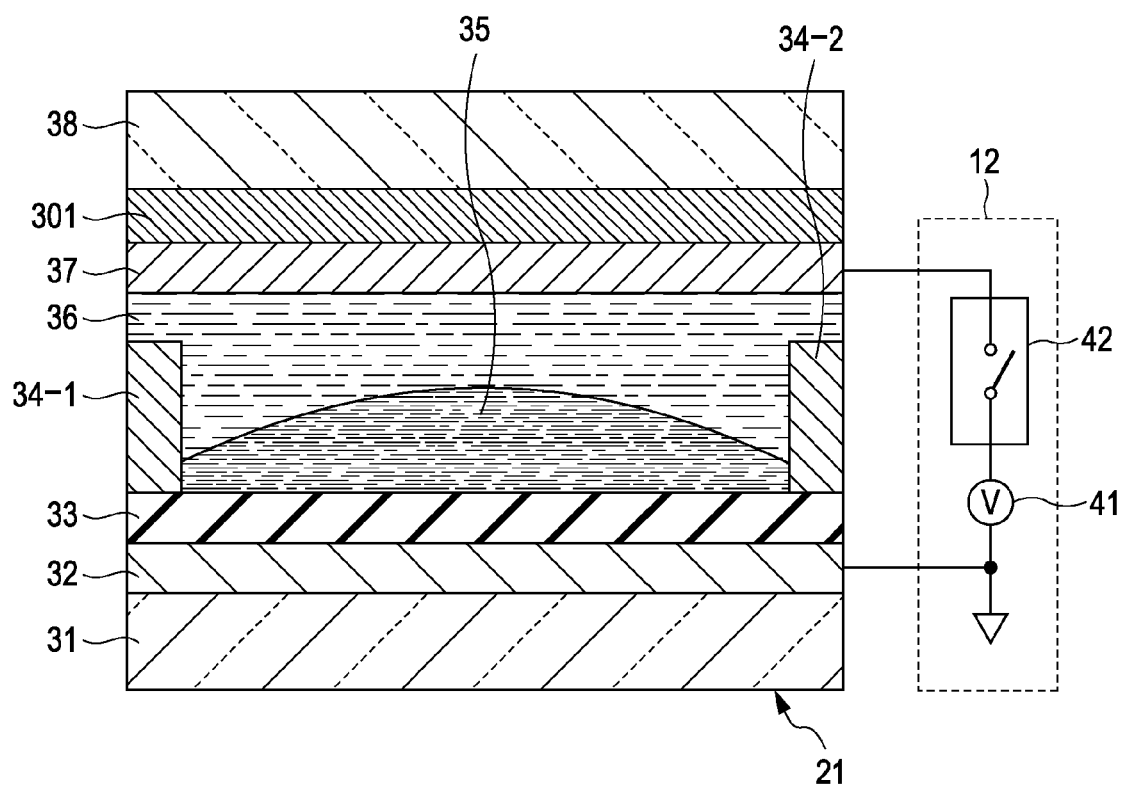
FIG. 23 illustrates another exemplary configuration of a liquid device.

Alternatively, as illustrated in FIG. 23, a color may be reproduced through the use of a color filter. FIG. 23 illustrates an exemplary configuration of a liquid device 21 in this case and corresponds to FIG. 2. In the example of FIG. 23, the liquid device 21 includes a transparent color filter 301 disposed between the upper electrode 37 and the upper substrate 38. The color filter 301 allows only red light, green light, or blue light to pass therethrough. In other words, light transmitted through the liquid device 21 means light transmitted through the color filter 301.

Here, the nonpolar liquid 35 is black in color and thus blocks light when expands. Therefore, when the nonpolar liquid 35 contracts and the optical shutter is opened, light emitted from the light-emitting source 11 passes through a portion where, in the rib pixel of the liquid device 21, the layer of the nonpolar liquid 35 is not present and only the layer of the polar liquid 36 is present. Then, the light is transmitted through the color filter 301 and emitted from the liquid device 21. That is, when the nonpolar liquid 35 contracts and the optical shutter is opened, the liquid device 21 emits light of the color of the color filter 301, while when the nonpolar liquid 35 expands and the optical shutter is closed, the liquid device 21 blocks light. This configuration makes it possible to significantly improve color reproducibility.

Figure 24:
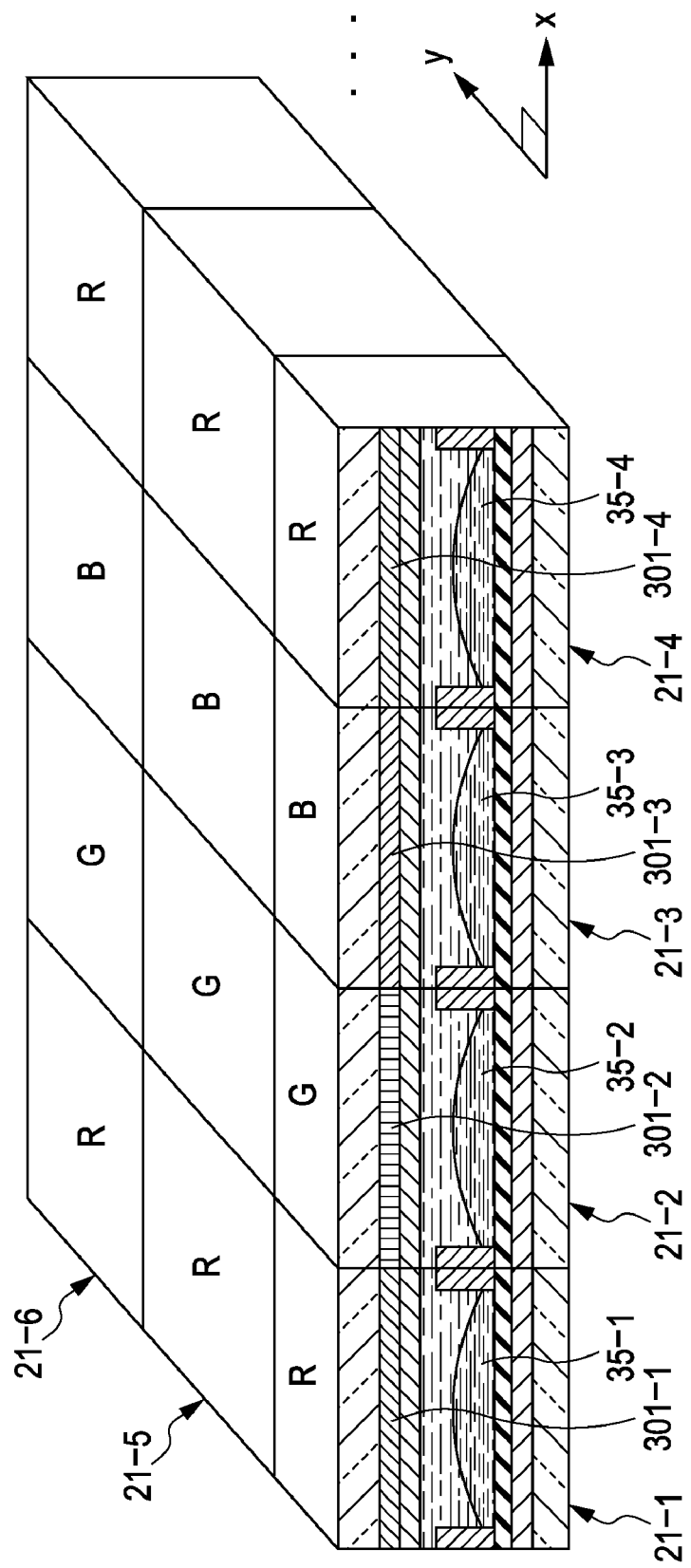
FIG. 24 illustrates another exemplary arrangement of liquid devices.

FIG. 24 illustrates an exemplary arrangement of such liquid devices 21. Similar to the case of FIG. 22, in FIG. 24, the liquid devices 21 are arranged such that the color filters 301 of the same color are arranged in the Y direction, while "red", "green", and "blue" color filters 301 are repetitively arranged in this order in the X direction.

For example, a color filter 301-1 in the liquid device 21-1 and a color filter 301-4 in the liquid device 21-4, the color filter 301-1 and color filter 301-4 being indicated by diagonal lines running from bottom-left to top-right, are red in color; a color filter 301-2 indicated by vertical lines in the liquid device 21-2 is green in color; and a color filter 301-3 indicated by diagonal lines running from top-left to bottom-right in the liquid device 21-3 is blue in color. At the same time, the color filters 301 in the liquid devices 21 marked with the letter "R" on the top surface (such as the liquid device 21-5 and the liquid device 21-6) are red in color; the color filters 301 in the liquid devices 21 marked with the letter "G" on the top surface are green in color; and the color filters 301 in the liquid devices 21 marked with the letter "B" on the top surface are blue in color. Also, in the case of FIG. 24, the nonpolar liquids 35 in all the liquid devices 21 are black in color.

Similar to the case of FIG. 22, the colors of the color filters 301 in the liquid devices 21 may be arranged in any manner. For example, the colors may be arranged in a Bayer pattern and do not necessarily need to be arranged in the manner illustrated in FIG. 24. The number of colors of the color filters 301 may be two, four, or more. Again, the letters "R", "G", "B" in FIG. 24 are provided for illustrative purposes only and not actually printed on the actual liquid devices 21.

Also, as in the case of FIG. 2, the nonpolar liquid 35 in each liquid device 21 may be of any color which does not allow light to be transmitted through the nonpolar liquid 35.

Although the image display apparatus has been described as a transmissive display having the light-emitting source 11 at the rear of the image display unit 13, the image display apparatus may be, for example, a reflective display.

Figure 25:
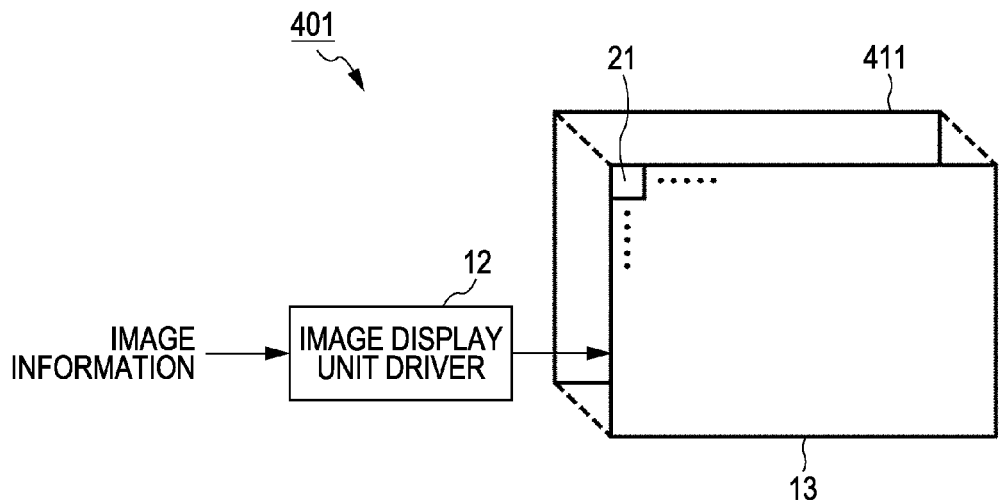
FIG. 25 is a block diagram illustrating another exemplary configuration of an image display apparatus to which the present application is applied.

FIG. 25 is a block diagram illustrating an exemplary configuration of a reflective image display apparatus to which the present application is applied. FIG. 25 corresponds to FIG. 1. As in the case of the image display apparatus 1 of FIG. 1, an image display apparatus 401 of FIG. 25 includes the image display unit driver 12 and the image display unit 13. However, the image display apparatus 401 of FIG. 25 includes a light reflector 411 instead of the light-emitting source 11 of FIG. 1.

The light reflector 411 is, for example, a metal plate of high reflectivity. The light reflector 411 reflects light transmitted through the liquid device 21 back to the liquid device 21. The light reflector 411 may be a white scattering plate which is made of titanium oxide or the like and reflects light such that the reflected light scatters uniformly in space.

In the image display apparatus 401, light incident on the front surface of the image display unit 13 is transmitted through the image display unit 13, reflected by the light reflector 411, transmitted through the image display unit 13, and reaches the user's eye. Thus, it appears to the user that an image is displayed on the image display surface.

Although not shown, a light source is disposed opposite the light reflector 411 with respect to the image display unit 13, that is, disposed on the side where the user is present. Then, light is emitted from the light source toward the image display unit 13. This light may be artificial light, such as light from an illuminating device, sunlight, or may be both.

The configuration of the liquid device 21 in the example of FIG. 25 is basically the same as that described with reference to FIG. 2. However, in the present case, light is once incident on the side of the upper substrate 38. Of the light incident on the image display unit 13, a portion incident on the liquid device 21 in a state where the optical shutter is opened is transmitted through the liquid device 21 and reflected by the light reflector 411. The action of the liquid device 21 on the reflected light is the same as that in the case of the liquid device 21 of the image display apparatus 1 illustrated in FIG. 1.

However, in the present case, although light incident on the side of the upper substrate 38 in the liquid device 21 is blocked by the expanded nonpolar liquid 35 when the optical shutter is closed, it is desirable to suppress generation of reflected light from the nonpolar liquid 35. In other words, it is desirable that an image be expressed in black at the position of a liquid device 21 where the optical shutter is closed. For example, it is desirable that the color of the nonpolar liquid 35 be black, which absorbs light of various wavelengths.

Figure 26:
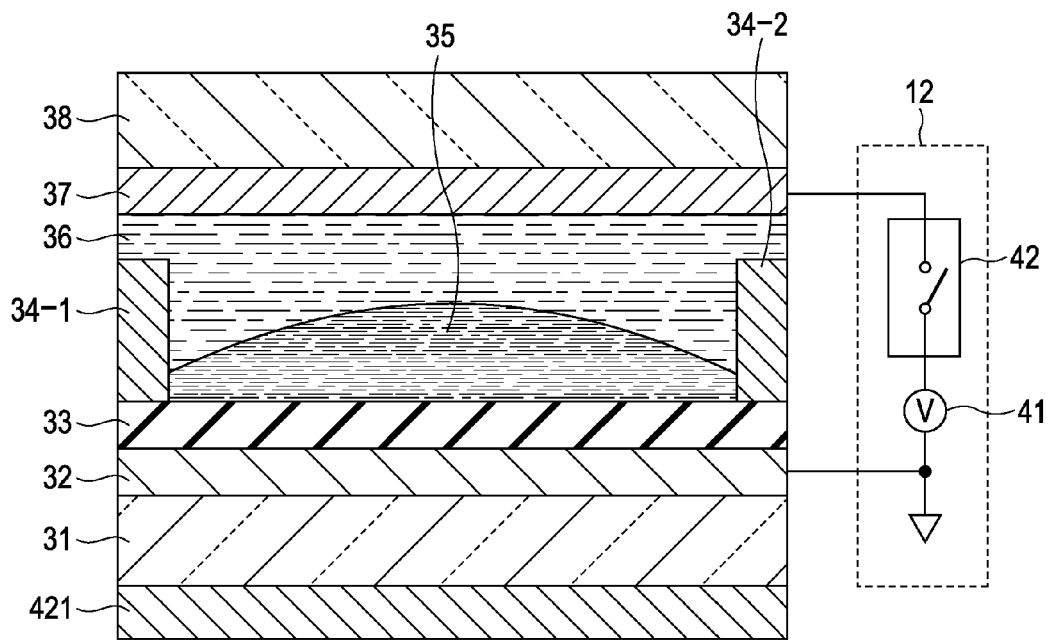
FIG. 26 illustrates another exemplary configuration of a liquid device.
Figure 27:
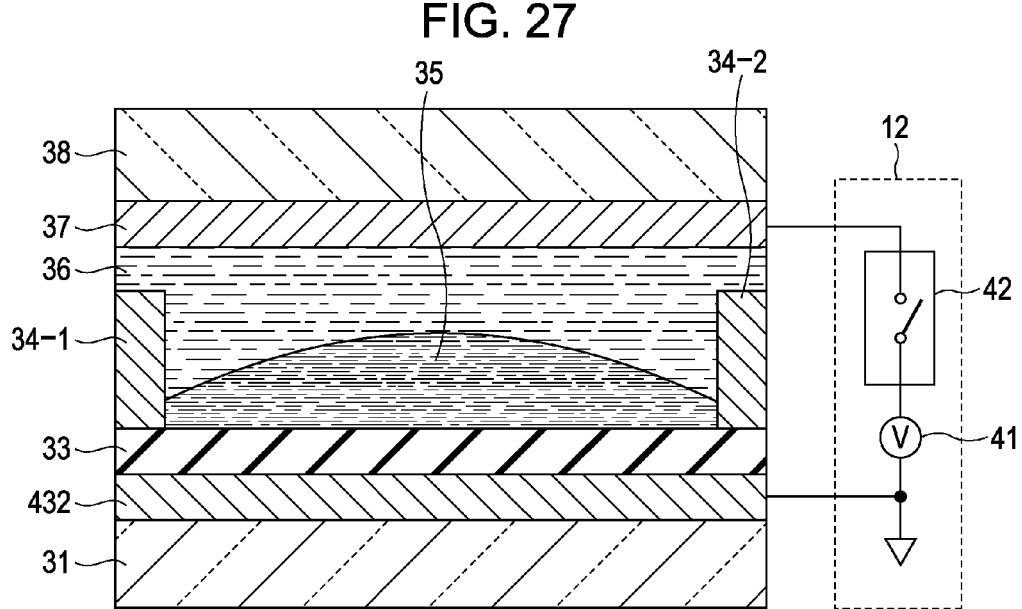
FIG. 27 illustrates another exemplary configuration of a liquid device.

The image display apparatus 401 of FIG. 25 may be configured such that the image display unit 13 and the light reflector 411 combine to make a single unit and that the liquid device 21 is formed as illustrated in FIG. 26 or FIG. 27.

In the example of FIG. 26, a white scattering plate 421 is formed as an additional layer under the lower substrate 31, that is, on the rear side of the image display unit 13. As described above, the white scattering plate 421 is a layer that is made of titanium oxide or the like and reflects light such that the reflected light scatters uniformly in space. That is, in this case, light incident on the liquid device 21 from the upper side in FIG. 26 is reflected by the white scattering plate 421 and emitted upward in FIG. 26.

In the example of FIG. 27, an opaque lower electrode 432 made of metal or the like is provided instead of the transparent lower electrode 32. In this case, light incident on the liquid device 21 from the upper side in FIG. 27 is reflected by the lower electrode 432 and emitted upward in FIG. 27.

In the example of FIG. 26, since light reflected by the white scattering plate 421 is pure white light, a higher-quality image than that in the case of FIG. 27 can be obtained. However, this may lead to a more complex structure and higher manufacturing costs.

As in the case of the image display apparatus 1 illustrated with reference to FIG. 1, the image display apparatus 401 of reflective type can display a binary image or a gray-scale image by making the color of the nonpolar liquid 35 in the liquid device 21 black, which is opaque.

As illustrated with reference to FIG. 22, the liquid devices 21, each having the nonpolar liquid 35 which is red, green, or blue in color, may be arranged in a predetermined pattern such that the image display unit 13 can display a color image. The nonpolar liquid 35 may either be translucent or opaque. If the nonpolar liquid 35 is opaque, light incident on the liquid device 21 from the front side is reflected by the nonpolar liquid 35 and emitted as light of a predetermined color from the front side. That is, in this case, a component for reflecting light, such as the light reflector 411 or the white scattering plate 421, can be omitted. Here, the intensity of reflected light increases as the optical shutter closes and decreases as the optical shutter opens. In other words, the control method carried out here by the image display unit driver 12 is the reverse of those in the other examples described above.

Figure 28:
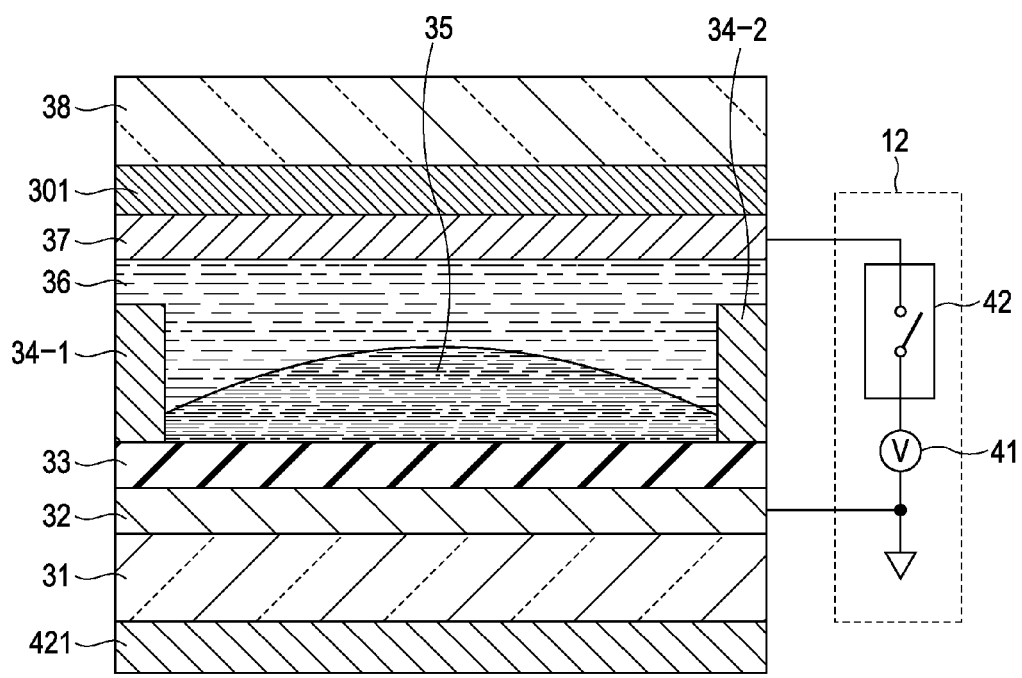
FIG. 28 illustrates another exemplary configuration of a liquid device.
Figure 29:
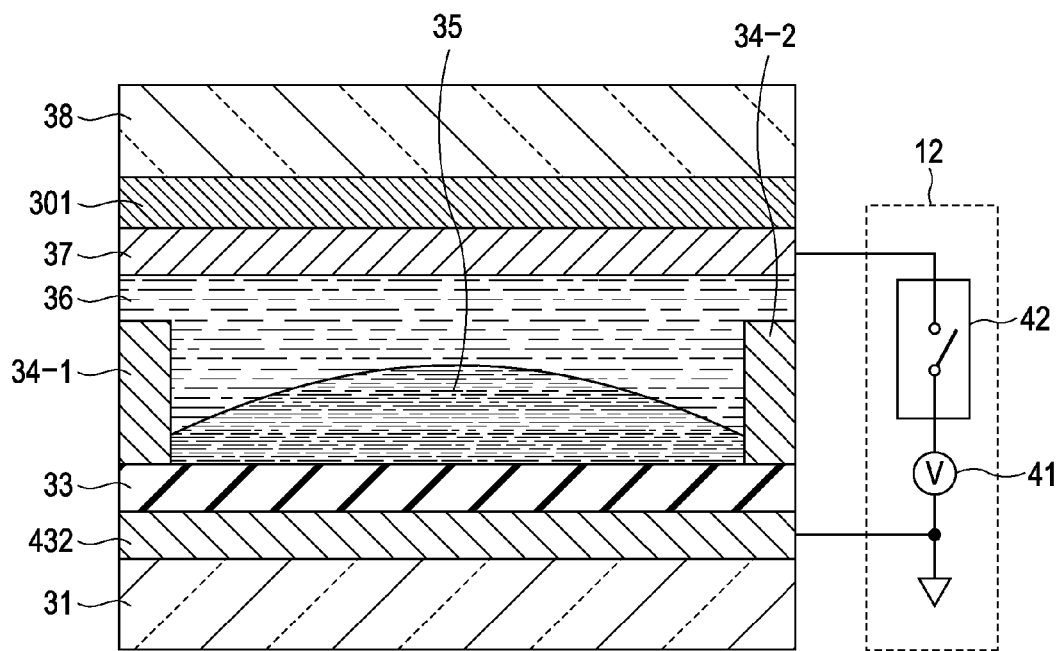
FIG. 29 illustrates another exemplary configuration of a liquid device.

As in the case of the image display apparatus 1 of transmissive type, the liquid device 21 in the image display apparatus 401 of reflective type may include the color filter 301 as illustrated in FIG. 28 and FIG. 29. FIG. 28 illustrates an exemplary configuration of the liquid device 21 that includes the color filter 301 and the white scattering plate 421. FIG. 29 illustrates an exemplary configuration of the liquid device 21 that includes the color filter 301 and the lower electrode 432, which is opaque. In other words, FIG. 28 corresponds to FIG. 26 and illustrates an exemplary configuration obtained by adding the color filter 301 to the liquid device 21 of FIG. 26, while the FIG. 29 corresponds to FIG. 27 and illustrates an exemplary configuration obtained by adding the color filter 301 to the liquid device 21 of FIG. 27.

In the case of FIG. 28 or FIG. 29, light reflected at the white scattering plate 421 or the lower electrode 432 is transmitted through the color filter 301 and emitted from the liquid device 21. Therefore, in the liquid device 21 where the black nonpolar liquid 35 contracts and the optical shutter is opened, light of the color of the color filter 301 is emitted from the front side as in the case of the image display apparatus 1 of transmissive type. On the other hand, in the liquid device 21 where the black nonpolar liquid 35 expands and the optical shutter is closed, transmitted light is blocked as in the case of the image display apparatus 1 of transmissive type. That is, again, it is desirable that an image be expressed in black at the position of a liquid device 21 where the optical shutter is closed. For example, it is desirable that the color of the nonpolar liquid 35 be black, which absorbs light of various wavelengths.

As described above, an image display apparatus of reflective type can be realized in basically the same manner as that in the case of an image display apparatus of transmissive type, and can display any of a binary image, a gray-scale image, and a color image.

Figure 30:
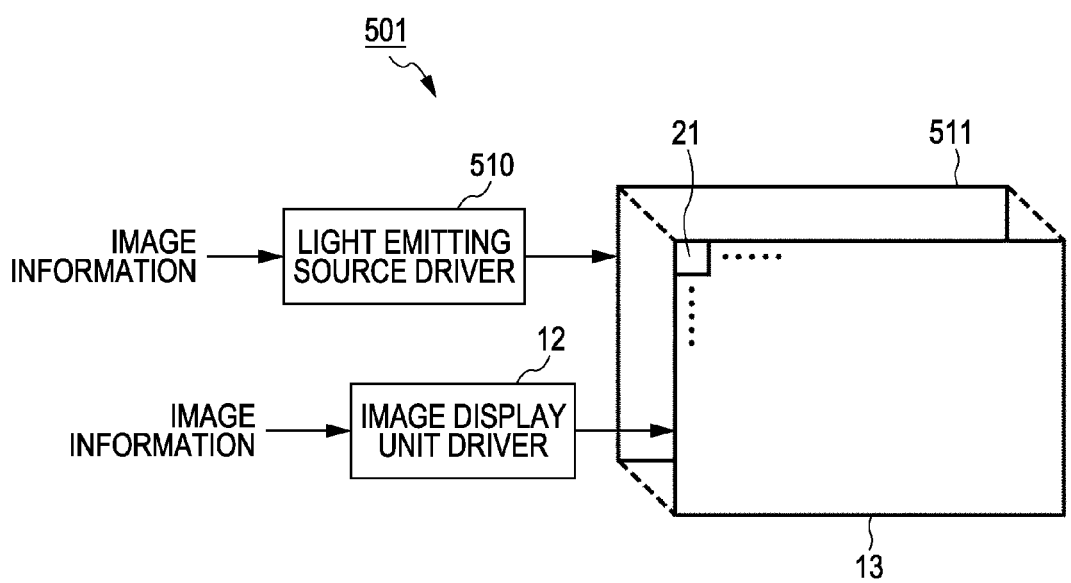
FIG. 30 is a block diagram illustrating another exemplary configuration of an image display apparatus to which the present application is applied.

Instead of a light-emitting source that emits light of a single color, a color light-emitting source that emits light of a plurality of colors may be included in an image display apparatus. FIG. 30 is a block diagram illustrating an exemplary configuration of such an image display apparatus to which the present application is applied.

Referring to FIG. 30, an image display apparatus 501 includes the image display unit driver 12 and the image display unit 13 as in the case of the image display apparatus 1 of FIG. 1. However, the image display apparatus 501 includes a light-emitting source driver 510 and a color light-emitting source 511, instead of the light-emitting source 11 of the image display apparatus 1.

For example, the color light-emitting source 511 uses light emitting diodes (LEDs) as a light source. Light emission of the LEDs allows the color light-emitting source 511 to emit red, green, and blue light beams from a light-emitting surface opposite the image display unit 13, sequentially, repetitively, and in a time-sharing manner. Red LEDs emitting red light, green LEDs emitting green light, and blue LEDs emitting blue light are arranged in an array over the entire light-emitting surface of the color light-emitting source 511. Each LED emits light according to the control of the light-emitting source driver 510.

In synchronization with the input of image information, the light-emitting source driver 510 controls the light emission of the LEDs in the color light-emitting source 511. This causes light beams of corresponding colors to be sequentially and repetitively emitted from the light-emitting surface in a predetermined pattern.

In other words, on the basis of the control of the light-emitting source driver 510, red, green, and blue light beams are emitted from the entire light-emitting surface of the color light-emitting source 511 in a predetermined time-sharing pattern. This means that red light is emitted from the entire light-emitting surface at some point in time, green light is emitted from the entire light-emitting surface at another point in time, and blue light is emitted from the entire light-emitting surface at still another point in time.

The LEDs arranged on the light-emitting surface of the color light-emitting source 511 may be different from each other, and may be of any type, size, and shape. The amount of light emission of each LED may be any amount, and the number of LEDs of each color may be any number. The LEDs of respective colors may be arranged in different patterns, or all the LEDs of the three colors may be arranged in a predetermined regular pattern, such as a Bayer pattern, or in an irregular pattern. That is, the LEDs may be arranged at any positions on the light-emitting surface. However, it is desirable, for example, to uniformly distribute red, green, and blue LEDs, all emitting the same amount of light, over the entire light-emitting surface so that light beams of the respective colors are eventually emitted by substantially the same amount from the entire light-emitting surface. That is, it is desirable that there be no variations in the amount of light over the entire light-emitting surface and there be no difference in the amount of light between the different colors.

Although LEDs have been described as an example of a light source, other light source may be used in place of the LEDs.

Light of the three different colors may be emitted in any time-sharing pattern and a time period assigned to each color may be of any length. However, it is desirable that the period of light emission of each color be short enough such that, for example, changes in the colors of emitted light cannot be recognized and that different colors appear to be mixed together to the human eye.

That is, it is desirable that when all the liquid devices 21 in the image display unit 13 are fixed with the optical shutters opened, it appear to the user viewing the image display surface that maximum amounts of light beams of three different colors are uniformly mixed together, uniformly distributed over the entire screen, and form a white image which is unchanged with time.

The image display unit 13 uses the light of such three different colors as backlight and allows each liquid device 21 to control the transmission of light of each color under the control of the image display unit driver 12 based on image information. Thus, the image display unit 13 controls the degree of mixture of the three different colors and causes a color image to be displayed on the image display surface.

In this case, since the transmitted light is red, green, or blue in color, the configuration of each liquid device 21 is the same as that illustrated in FIG. 2. That is, the nonpolar liquid 35 is a black opaque liquid which contains a black dye or is mixed with a black pigment, or in which a black dye is dissolved. No color filter and no white scattering plate are provided, and a transparent electrode is used as the lower electrode 32.

The liquid device 21 controls the degree of mixture of the three different colors by controlling the transmission of light of each color. That is, the liquid device 21 is driven to create a color of light to be emitted therefrom (i.e., a color visible to the user) by mixing the three colors of backlight emitted in a time-sharing manner. Any color can be created by a single liquid device 21. Here, "mixing colors" means creating a color that is visible to the user who will view the resulting image, and does not mean actually mixing light beams of different colors together. Although the details will be described below, light beams of different colors are temporally separated.

The liquid devices 21 may be driven independently, or divided into groups and driven in groups.

Figure 31:
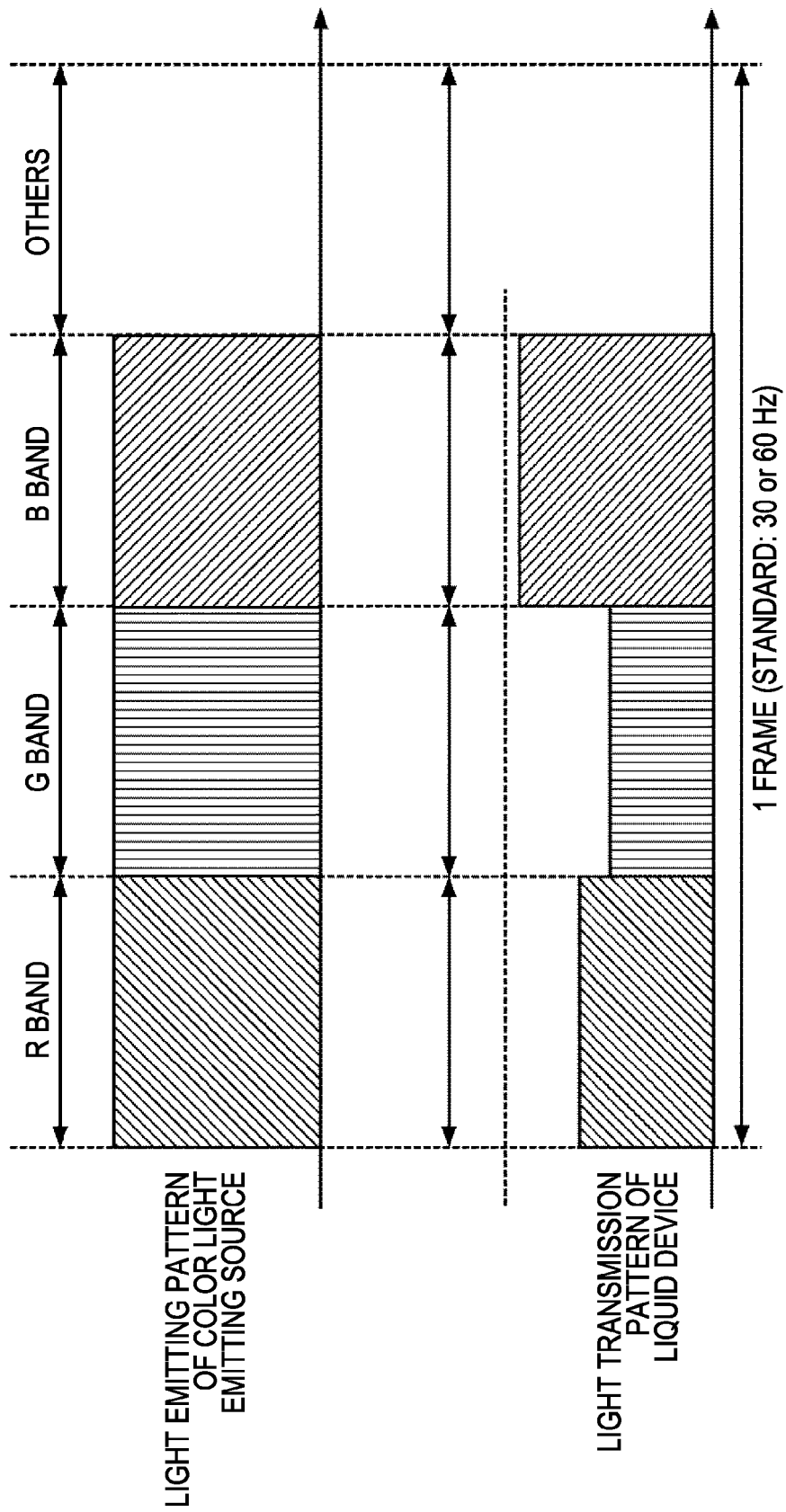
FIG. 31 illustrates an exemplary method for mixing colors.
Figure 32:
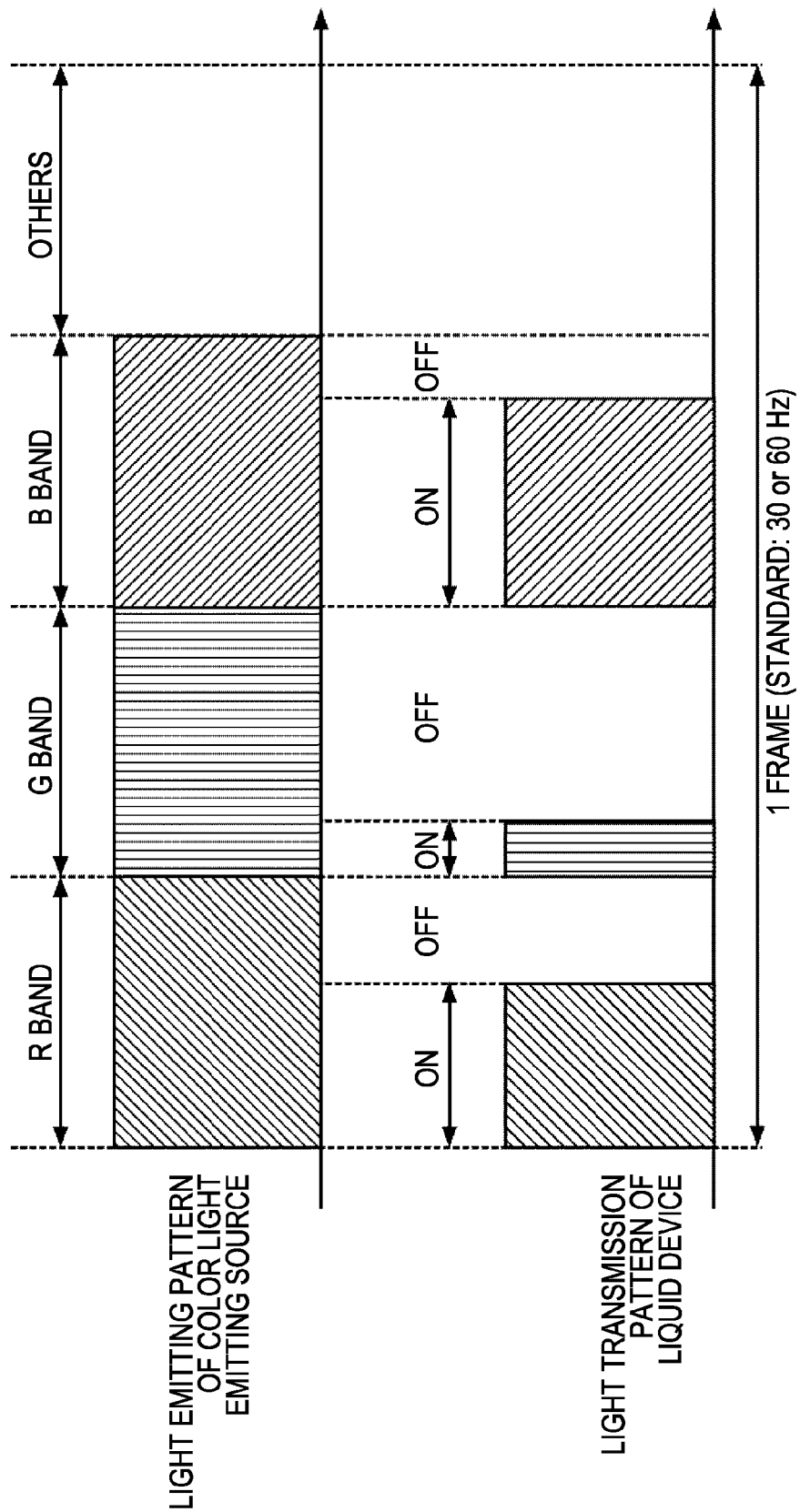
FIG. 32 illustrates another exemplary method for mixing colors.
Figure 33:
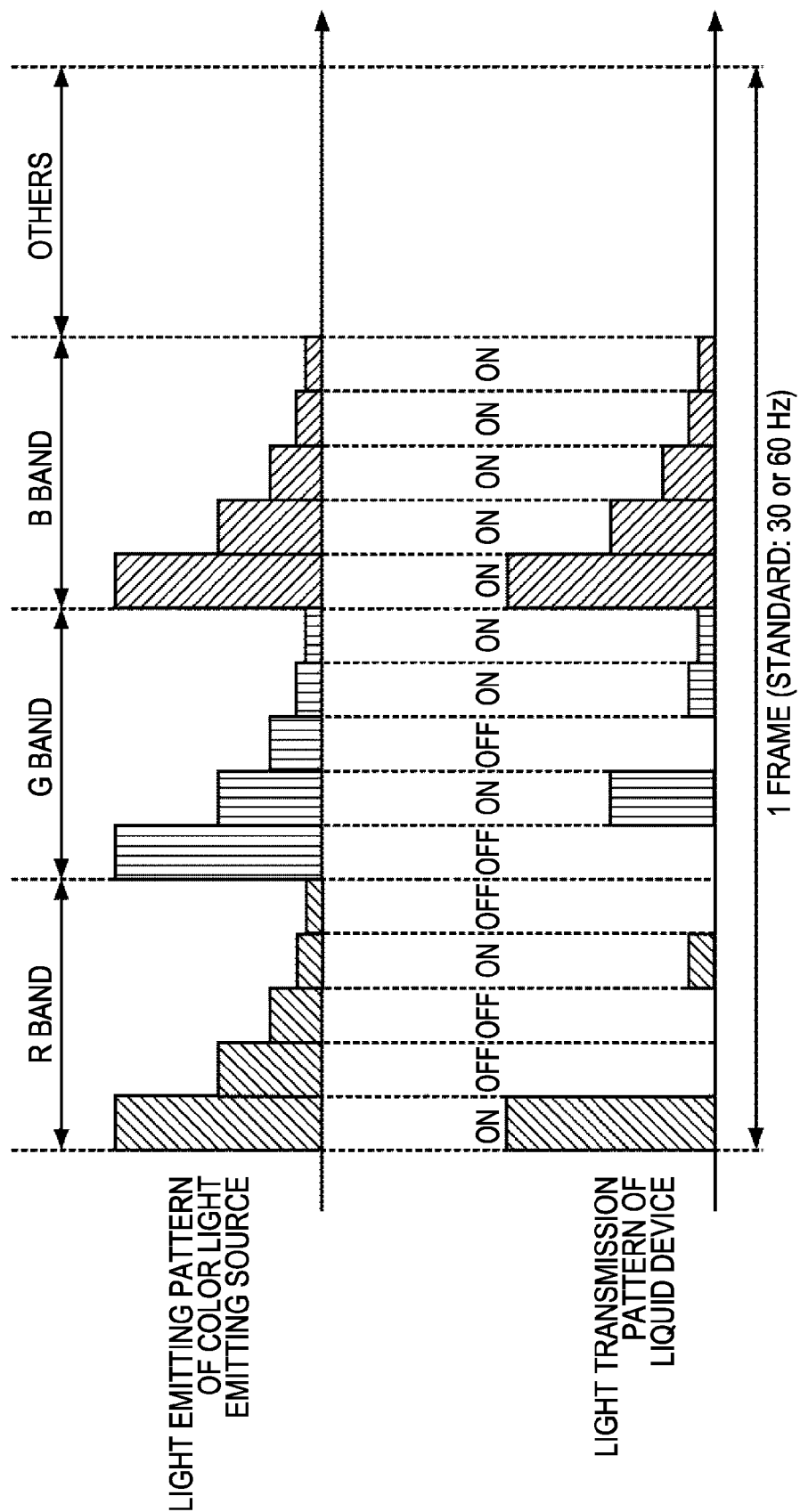
FIG. 33 illustrates another exemplary method for mixing colors.

Referring to FIG. 31 to FIG. 33, there will be described examples of light-emitting pattern of the color light-emitting source 511 and driven pattern of the liquid device 21 for mixing different colors. In FIG. 31 to FIG. 33, the horizontal axis represents time, while the vertical axis represents light intensity.

In the example of FIG. 31, the color light-emitting source 511 divides one frame period with a standard frequency of 30 Hz or one field period with a standard frequency of 60 Hz into four sub-periods, which are assigned to respective four bands, "R band", "G band", "B band", and "others". The color light-emitting source 511 causes a red LED to emit light at a constant intensity in R band, causes a green LED to emit light at a constant intensity in G band, and causes a blue LED to emit light at a constant intensity in B band. The light intensity levels of these LEDs are equal. Also, at least R band, G band, and B band each are assigned the same period of time. From the light-emitting surface of the color light-emitting source 511, beams of red light, green light, and blue light are emitted in R band, G band, and B band, respectively. The amounts of light of these three colors are the same.

At the same time, each liquid device 21 varies the degree of opening of the optical shutter in an analog manner so as to control the amount of transmitted light (i.e., the amount of light transmission) in an analog manner. By adjusting the voltage of the power supply 41 in an analog manner, the image display unit driver 12 can apply any voltage to the lower electrode 32 and upper electrode 37 of each liquid device 21 and thus control the amount of change of the nonpolar liquid 35, that is, the degree of contraction or expansion of the nonpolar liquid 35. Thus, each liquid device 21 can control the amount of light transmitted through the rib pixel in an analog manner. As illustrated in FIG. 31, the liquid device 21 can control the amount of light transmission for each color, control the amount of light of each color to be mixed, and create any color.

In the other band ("others"), the color light-emitting source 511 does not allow LEDs of any color to emit light. This makes the color of backlight black. Alternatively, in the other band, the color light-emitting source 511 may cause all LEDs to emit light to make the color of backlight white, or may cause only some LEDs to emit light. The backlight in the other band may be of any color except red, green, and blue.

Alternatively, without providing the other band described above, one frame or field period may be divided into three sub-periods, which are assigned to respective three bands, R band, G band, and B band. Generally, however, this may cause color breakup when a field sequential color method is used to mix colors of light emitted in a time-sharing manner. This means that if the user's eye moves from top-right to bottom-left of the display screen, the resulting color may look different from the original. However, if one frame or field period is divided into four, instead of three, as described above, it is possible to reduce the occurrence of color breakup.

In the example of FIG. 31, the liquid device 21 controls the amount of transmitted light by controlling the degree of opening of the optical shutter. Alternatively, the amount of transmitted light may be controlled by controlling the amount of time during which the optical shutter is open.

In the example of FIG. 32, LEDs of all colors in the color light-emitting source 511 emit light at a constant intensity for the same period of time, that is, in a pattern identical to that illustrated in FIG. 31. However, in the example of FIG. 32, each liquid device 21 in the image display unit 13 operates in a pattern different from that illustrated in FIG. 31. In the example of FIG. 32, each liquid device 21 controls, in an analog manner, the amount of time during which the optical shutter is open.

That is, by adjusting the ON and OFF periods of the switch 42 in an analog manner, the image display unit driver 12 controls the amount of time during which a voltage is applied to the lower electrode 32 and upper electrode 37 of each liquid device 21, and thus controls the amount of time during which the nonpolar liquid 35 is stable in a contracting mode or in an expanding mode. That is, in this case, the liquid device 21 becomes stable only in two modes where the optical shutter is open and closed. By controlling the lengths of time of the two stable modes, the liquid device 21 controls the amount of time during which light in the rib pixel is transmitted, and then controls the amount of the transmitted light. Thus, as illustrated in FIG. 32, the liquid device 21 can control the amount of light transmission for each color, control the amount of light of each color to be mixed, and create any color.

Also, it is possible to combine the examples of FIG. 31 and FIG. 32. In other words, each liquid device 21 may control both the degree of opening of the optical shutter and the amount of time during which the optical shutter is open. This makes it possible to control the amount of transmitted light of each color and create any color.

Alternatively, as illustrated in FIG. 33, the intensity of light emitted from each LED of the color light-emitting source 511 may be varied.

In the example of FIG. 33, R band, G band, and B band each are further divided into five sub-bands, where the intensity of light emitted from each LED in one sub-band is different from that in another sub-band. In the example of FIG. 33, each LED emits light at the maximum intensity level in the first sub-band and decreases its light intensity in a stepwise manner in the subsequent sub-bands. That is, the light-emitting source 11 emits red light in R band such that it is brightest at the beginning and gradually becomes darker, emits green light in G band such that it is brightest at the beginning and gradually becomes darker, emits blue light in B band such that it is brightest at the beginning and gradually becomes darker, and turns off all LEDs in the other band.

For the color light-emitting source 511 emitting light in the pattern described above, each liquid device 21 in the image display unit 13 controls the opening and closing of the optical shutter with respect to each sub-band. In other words, the image display unit driver 12 controls the ON/OFF of the switch 42 with respect to each sub-band. This allows the liquid device 21 to control transmission and blockage of light emitted from the light-emitting surface of the color light-emitting source 511 with respect to each sub-band. As described above, the intensity of light emitted from the light-emitting surface of the color light-emitting source 511 varies from one sub-band to another. Therefore, each liquid device 21 can control the amount of light of each color at multiple levels by selectively allowing light in sub-bands to pass through.

In the example of FIG. 33, the liquid device 21 allows light in the first and fourth sub-bands to pass through in R band; allows light in the second, fourth, and fifth sub-bands to pass through in G band; and allows light in all sub-bands to pass through in B band. Since the total amount of light transmitted in all sub-bands of each of R band, G band, and B band is the amount of light of the corresponding color, the liquid device 21 can control the amount of light of each color at multiple levels by variously combining sub-bands in which light is allowed to pass through. Thus, the liquid device 21 can control the amount of light of each color to be mixed at multiple levels and can create virtually any color.

The number of sub-bands into which a band for each color is divided may be any number. In a band for each color, the intensity of light may be changed linearly. At the same time, as in the example of FIG. 31, the degree of opening of the optical shutter in the liquid device 21 may be controlled. Also, as in the example of FIG. 32, the length of time during which the optical shutter in the liquid device 21 is open may be controlled.

As described above, the liquid device 21 to which the present application is applied is applicable to various types of image display apparatuses.

The series of processing described above can be executed either by hardware or by software. When the series of processing described above is executed by software, programs constituting the software are installed from a network or a recording medium.

For example, such a recording medium may be the removable medium 121 (see FIG. 11), such as a magnetic disk (including flexible disk), an optical disk (including compact disk-read only memory (CD-ROM) and digital versatile disk (DVD)), a magneto-optical disk (including mini-disk (MD) (registered trademark)), or a semiconductor memory, which contains the programs and is distributed separately from the apparatus main body (e.g., as illustrated in FIG. 11) to users for the purpose of supplying the programs to the users. The recording medium may be a medium incorporated in the apparatus main body, particularly in the controller 111 or the like, in advance and distributed to users. Examples of such a medium include a ROM in which the programs are recorded or a hard disk included in a storage unit.

In the present specification, the steps describing the programs recorded in the recording medium include not only processing that is carried out sequentially in the order of description, but also processing that is not necessarily carried out sequentially but is carried out simultaneously or individually.

Also, in the present specification, a system refers to the overall apparatus which includes a plurality of devices.

A configuration having been described as a single apparatus may be divided into a plurality of apparatuses. Conversely, configurations having been described as a plurality of apparatuses may be combined to form a single apparatus. An element other than those described above may be added to the configuration of each apparatus. Part of an apparatus may be included in another apparatus as long as the configuration and operation of the overall system remain virtually unchanged.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical shutter for controlling the amount of transmission of light emitted from a display device, the optical shutter comprising:
   a partition wall configured to surround and isolate a light-transmitting portion through which the light is transmitted;
   a polar liquid having polarity, allowing transmission of light, and placed at the light-transmitting portion surrounded by the partition wall;
   a nonpolar liquid having no polarity, blocking transmission of light, and placed at the light-transmitting portion surrounded by the partition wall;
   an insulator having hydrophobic properties and disposed over the entire light-transmitting portion surrounded by the partition wall;
   a first electrode; and
   a second electrode different from the first electrode,
   wherein when no voltage is applied across the first electrode and the second electrode, the nonpolar liquid spreads near the insulator, becomes stable, and thus blocks transmission of the light;
   when a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light; and
   the following conditions are satisfied, $$100\ \mu m^2 \leq A \leq 30000\ \mu m^2$$

$$1\ \mu m \leq H \leq 10\ \mu m$$

where A denotes the area of a light-transmitting surface of the light-transmitting portion surrounded by the partition wall, the light-transmitting surface being orthogonal to a traveling direction of the light, and H denotes the height of the partition wall.

2. The optical shutter according to claim 1, further comprising two substrates facing each other,
   wherein the first electrode and the second electrode are formed on respective facing surfaces of the two substrates;

the partition wall and the insulator are formed on a side adjacent to one of the facing surfaces of the two substrates; and the polar liquid and the nonpolar liquid are placed in a portion interposed between the two substrates and surrounded by the partition wall.

3. The optical shutter according to claim 1, further comprising a color filter disposed downstream of the polar liquid and the nonpolar liquid in a direction in which the light is output.

4. The optical shutter according to claim 1, wherein the nonpolar liquid is colored to block the light.

5. The optical shutter according to claim 1, further comprising white scattering means disposed on a side opposite to the display device.

6. The optical shutter according to claim 1, wherein out of the first electrode and the second electrode, an electrode on a side opposite to the display device is opaque.

7. An image display apparatus comprising:

a light source; and an image display unit configured to transmit light emitted from the light source, wherein the image display unit has an optical shutter for controlling the amount of transmission of the light emitted from the light source, the optical shutter including a partition wall configured to surround and isolate a light-transmitting portion through which the light is transmitted;

a polar liquid having polarity, allowing transmission of light, and placed at the light-transmitting portion surrounded by the partition wall;

a nonpolar liquid having no polarity, blocking transmission of light, and placed at the light-transmitting portion surrounded by the partition wall;

an insulator having hydrophobic properties and disposed over the entire light-transmitting portion surrounded by the partition wall;

a first electrode; and a second electrode different from the first electrode, wherein when no voltage is applied across the first electrode and the second electrode, the nonpolar liquid spreads near the insulator, becomes stable, and thus blocks transmission of the light;

when a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light; and the following conditions are satisfied, $$100\ \mu m^2 \leq A \leq 30000\ \mu m^2$$

$$1\ \mu m \leq H \leq 10\ \mu m$$

where A denotes the area of a light-transmitting surface of the light-transmitting portion surrounded by the partition wall, the light-transmitting surface being orthogonal to a traveling direction of the light, and H denotes the height of the partition wall.

8. The image display apparatus according to claim 7, further comprising two substrates facing each other, wherein the first electrode and the second electrode are formed on respective facing surfaces of the two substrates;

the partition wall and the insulator are formed on a side adjacent to one of the facing surfaces of the two substrates; and the polar liquid and the nonpolar liquid are placed in a portion interposed between the two substrates and surrounded by the partition wall.

9. The image display apparatus according to claim 7, further comprising a color filter disposed downstream of the polar liquid and the nonpolar liquid in a direction in which the light is output.

10. The image display apparatus according to claim 7, wherein the nonpolar liquid is colored to block the light.

11. The image display apparatus according to claim 7, further comprising white scattering means disposed on a side opposite to the display device.

12. The image display apparatus according to claim 7, wherein out of the first electrode and the second electrode, an electrode on a side opposite to the display device is opaque.

13. An optical shutter for controlling the amount of transmission of light emitted from a display device, the optical shutter comprising:

a partition wall configured to surround and isolate a light-transmitting portion through which the light is transmitted;

a polar liquid having polarity, allowing transmission of light, and placed at the light-transmitting portion surrounded by the partition wall;

a nonpolar liquid having no polarity, blocking transmission of light, and placed at the light-transmitting portion surrounded by the partition wall;

an insulator having hydrophobic properties and disposed over the entire light-transmitting portion surrounded by the partition wall;

a first electrode; and a second electrode different from the first electrode, wherein when no voltage is applied across the first electrode and the second electrode, the nonpolar liquid spreads near the insulator, becomes stable, and thus blocks transmission of the light; and when a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light.

14. An image display apparatus comprising:

a light source; and an image display unit configured to transmit light emitted from the light source, wherein the image display unit has an optical shutter for controlling the amount of transmission of the light emitted from the light source, the optical shutter including a partition wall configured to surround and isolate a light-transmitting portion through which the light is transmitted;

a polar liquid having polarity, allowing transmission of light, and placed at the light-transmitting portion surrounded by the partition wall;

a nonpolar liquid having no polarity, colored in at least one of red, green and blue, and placed at the light-transmitting portion surrounded by the partition wall;

an insulator having hydrophobic properties and disposed over the entire light-transmitting portion surrounded by the partition wall;

a first electrode; and a second electrode different from the first electrode, wherein when no voltage is applied across the first electrode and the second electrode, the nonpolar liquid spreads near the insulator, becomes stable, and thus blocks transmission of the light; and when a voltage is applied across the first electrode and the second electrode, the polar liquid gravitates toward the insulator because of a change in wettability of the insulator against the polar liquid and causes the nonpolar liquid to collect in a part of the light-transmitting portion according to the level of the voltage, thereby controlling the amount of transmission of the light.

* * * * *